United States Patent
Park et al.

(10) Patent No.: US 10,685,421 B1
(45) Date of Patent: *Jun. 16, 2020

(54) CONFIGURABLE CONVOLUTION ENGINE FOR INTERLEAVED CHANNEL DATA

(71) Applicant: Apple Inc., Cupertino, CA (US)

(72) Inventors: Sung Hee Park, Cupertino, CA (US); Muge Wang, Cupertino, CA (US); Junji Sugisawa, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,120

(22) Filed: Oct. 25, 2019

Related U.S. Application Data

(63) Continuation of application No. 16/203,550, filed on Nov. 28, 2018, now Pat. No. 10,489,880, which is a
(Continued)

(51) Int. Cl.
*G06F 17/15* (2006.01)
*G06T 1/20* (2006.01)
(Continued)

(52) U.S. Cl.
CPC .............. *G06T 1/20* (2013.01); *G06F 17/153* (2013.01); *G06K 9/00986* (2013.01);
(Continued)

(58) Field of Classification Search
None
See application file for complete search history.

(56) References Cited

U.S. PATENT DOCUMENTS

| 4,399,536 A | 8/1983 | Metz |
| 4,694,407 A | 9/1987 | Ogden |

(Continued)

FOREIGN PATENT DOCUMENTS

| CN | 104484658 A | 4/2015 |
| JP | 64-009574 A | 1/1989 |
| JP | 2008-310649 A | 12/2008 |

OTHER PUBLICATIONS

Feichtenhofer, C., et al., "Convolutional Two-Stream Network Fusion for Video Action Recognition", 2016 IEEE Conference on Computer Vision and Pattern Recognition (CVPR), IEEE, Jun. 27, 2016, pp. 1933-1941.
(Continued)

*Primary Examiner* — David H Malzahn
(74) *Attorney, Agent, or Firm* — Fenwick & West LLP

(57) ABSTRACT

Embodiments relate to a configurable convolution engine that receives configuration information to perform convolution and other deep machine learning operations on streaming input data of various formats. The convolution engine may include two convolution circuits that each generate a stream of values by applying convolution kernels to input data. The stream of values may each define one or more channels of image data. A channel merge circuit combines the streams of values from each convolution circuit in accordance with a selected mode of operation. In one mode, the first and second streams from the convolution circuits are merged into an output stream having the combined channels of the first and second streams in an interleaved manner. In another mode, the first stream from the first convolution circuit is fed into the input of the second convolution circuit.

20 Claims, 20 Drawing Sheets

Related U.S. Application Data continuation of application No. 15/499,543, filed on Apr. 27, 2017, now Pat. No. 10,176,551.

(51) Int. Cl.
| | |
|---|---|
| *G06K 9/46* | (2006.01) |
| *G06K 9/00* | (2006.01) |
| *G06N 3/04* | (2006.01) |
| *G06T 5/20* | (2006.01) |
| *G06T 5/00* | (2006.01) |
| *G06N 3/08* | (2006.01) |
| *G06N 3/063* | (2006.01) |

(52) U.S. Cl.
CPC ......... *G06K 9/4628* (2013.01); *G06K 9/4647* (2013.01); *G06N 3/0454* (2013.01); *G06N 3/063* (2013.01); *G06N 3/08* (2013.01); *G06T 5/001* (2013.01); *G06T 5/20* (2013.01)

(56) References Cited

U.S. PATENT DOCUMENTS

| | | | |
|---|---|---|---|
| 5,809,182 | A | 9/1998 | Ward et al. |
| 6,118,902 | A | 9/2000 | Knowles |
| 6,539,120 | B1 | 3/2003 | Sita et al. |
| 6,775,257 | B1 | 8/2004 | Watanabe |
| 6,993,208 | B2 | 1/2006 | Matsumoto |
| 7,071,944 | B2 | 7/2006 | MacInnis et al. |
| 7,266,255 | B1 | 9/2007 | Wasserman et al. |
| 7,379,105 | B1 | 5/2008 | Frank et al. |
| 7,653,088 | B2 | 1/2010 | Marko |
| 7,737,994 | B1 | 6/2010 | Wasserman et al. |
| 8,345,984 | B2 | 1/2013 | Ji et al. |
| 8,824,833 | B2 | 9/2014 | Dagher et al. |
| 8,917,952 | B2 | 12/2014 | Yang |
| 8,983,188 | B1 | 3/2015 | Lang et al. |
| 9,342,749 | B2 | 5/2016 | Li et al. |
| 9,858,636 | B1 | 1/2018 | Lim et al. |
| 10,169,295 | B2 * | 1/2019 | Du ........................ G06F 7/5443 |
| 10,176,551 | B2 * | 1/2019 | Park ........................ G06T 5/001 |
| 10,319,066 | B2 * | 6/2019 | Park ........................ G06T 1/20 |
| 10,325,342 | B2 * | 6/2019 | Park ........................ G06T 1/20 |
| 10,489,478 | B2 | 11/2019 | Lim et al. |
| 10,489,880 | B2 * | 11/2019 | Park ........................ G06N 3/08 |
| 2005/0041869 | A1 | 2/2005 | Cathier |
| 2006/0104236 | A1 | 5/2006 | Cho |
| 2006/0215929 | A1 | 9/2006 | Fresneau et al. |
| 2008/0151083 | A1 | 6/2008 | Hains et al. |
| 2009/0077359 | A1 | 3/2009 | Chakravarthula et al. |
| 2009/0128666 | A1 | 5/2009 | Rappaport et al. |
| 2013/0322501 | A1 | 12/2013 | Takeuchi et al. |
| 2015/0117760 | A1 | 4/2015 | Wang et al. |
| 2015/0172547 | A1 | 6/2015 | Wang et al. |
| 2016/0037044 | A1 | 2/2016 | Motta et al. |
| 2016/0267324 | A1 | 9/2016 | Shoaib et al. |
| 2016/0283818 | A1 | 9/2016 | Liu et al. |
| 2016/0295158 | A1 | 10/2016 | Van Belle |
| 2016/0328644 | A1 | 11/2016 | Lin et al. |
| 2016/0379073 | A1 | 12/2016 | Pan et al. |
| 2018/0005344 | A1 | 1/2018 | Lim et al. |
| 2018/0082400 | A1 | 3/2018 | Lim et al. |
| 2018/0137084 | A1 * | 5/2018 | Du ........................ G06F 7/5443 |
| 2018/0315153 | A1 * | 11/2018 | Park ........................ G06T 1/20 |
| 2018/0315154 | A1 * | 11/2018 | Park ........................ G06T 1/20 |
| 2018/0315155 | A1 * | 11/2018 | Park ................... G06K 9/00986 |
| 2019/0096026 | A1 * | 3/2019 | Park ........................ G06F 17/153 |

OTHER PUBLICATIONS

Hongwei, Q., et al., "Joint Training of Cascaded CNN for Face Detection," 2016 IEEE Conference on Computer Vision and Pattern Recognition (CVPR), IEEE, Jun. 27, 2016, pp. 3456-3465.

Karpathy, A., et al., "Large-Scale Video Classification with Convolutional Neural Network," 2014 IEEE Conference on Computer Vision and Pattern Recognition, IEEE, Jun. 23, 2014, pp. 1725-1732.

Krizhevsky, A., et al., "ImageNet classification with deep convolutional neural networks," Communications of the ACM, Association for Computing Machinery, Inc, United States, vol. 60, No. 6, 2e12, pp. 84-90, Jun. 2017.

PCT International Search Report and Written Opinion for PCT/US2018/021210, dated Jul. 26, 2018, 18 Pages.

Schrof, F., et al., "FaceNet: A unified embedding for face recognition and clustering," 2015 IEEE Conference on Computer Vision and Pattern Recognition (CVPR), IEEE, Jun. 7, 2015, pp. 815-823.

Simonyan, K., et al: "Two-Stream Convolutional Networks for Action Recognition in Videos", Jun. 9, 2014, pp. 1-9, Retrieved from the Internet: <URL:http://papers.nips.cc/paper/5353-two-streamconvolutiona- I-networks-for-action-recognition-in-videos.pdf>.

United States Office Action, U.S. Appl. No. 15/823,292, dated Apr. 19, 2019, 16 pages.

United States Office Action, U.S. Appl. No. 15/823,292, dated May 29, 2019, seven pages.

Zeiler, M., et al., "Visualizing and Understanding Convolutional Networks" In: Medical image computing and computer-assisted intervention—MICCAI 2015: 18th international conference, Munich, Germany, Oct. 59, 2015, Springer International Publishing, vol. 8689, pp. 818-833.

United States Office Action, U.S. Appl. No. 16/203,550, dated Mar. 28, 2019, six pages.

China National Intelletual Property Administration, Office Action, CN Patent Application No. 201880027358.X, dated Mar. 30, 2020, 13 pages.

* cited by examiner

CONFIGURABLE CONVOLUTION ENGINE FOR INTERLEAVED CHANNEL DATA

CROSS REFERENCE TO RELATED APPLICATION

This application is a continuation of U.S. patent application Ser. No. 16/203,550, now U.S. Pat. No. 10,489,880), titled "Configurable Convolution Engine for Interleaved Channel Data", filed Nov. 28, 2019, which is a continuation of U.S. patent application Ser. No. 15/499,543, now U.S. Pat. No. 10,176,551, titled "Configurable Convolution Engine for Interleaved Channel Data," filed Apr. 27, 2017, now U.S. Pat. No. 10,176,551, which are incorporated by reference in their entirety.

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Various types of image processing involves convolution between a kernel and data. Different kernels may be used to, for example, blur, sharpen, emboss or perform edge detect in the image. Such convolution operations are generally performed by the CPU which reduces its availability for other processes.

SUMMARY

Embodiments relate to a configurable convolution engine for performing convolution and machine learning operations of input data of various channels in a desired manner by configuring operations of the components in the convolution engine. The convolution engine includes a first convolution circuit, a second convolution circuit, and a channel merge circuit coupled to the first and second convolution circuits. The first and second convolution circuits each generate a stream of values by applying convolution kernels to input data, among other things. The stream of values may each define one or more channels of image data in an interleaved manner. The channel merge circuit combines the streams of values from the first and second convolution circuits in accordance with a selected mode of operation. In a dual-convolution mode, the first and second streams from the convolution circuits are merged into an output stream having the combined channels of the first and second streams in an interleaved manner. In a cascade mode, the first stream from the first convolution circuit is fed into the input of the second convolution circuit. The channel merge circuit outputs the result of the second convolution circuit as the output stream. In a parallel mode, the channel merge circuit outputs first and second streams from the first and second convolution circuits as separate streams.

Figure 1:
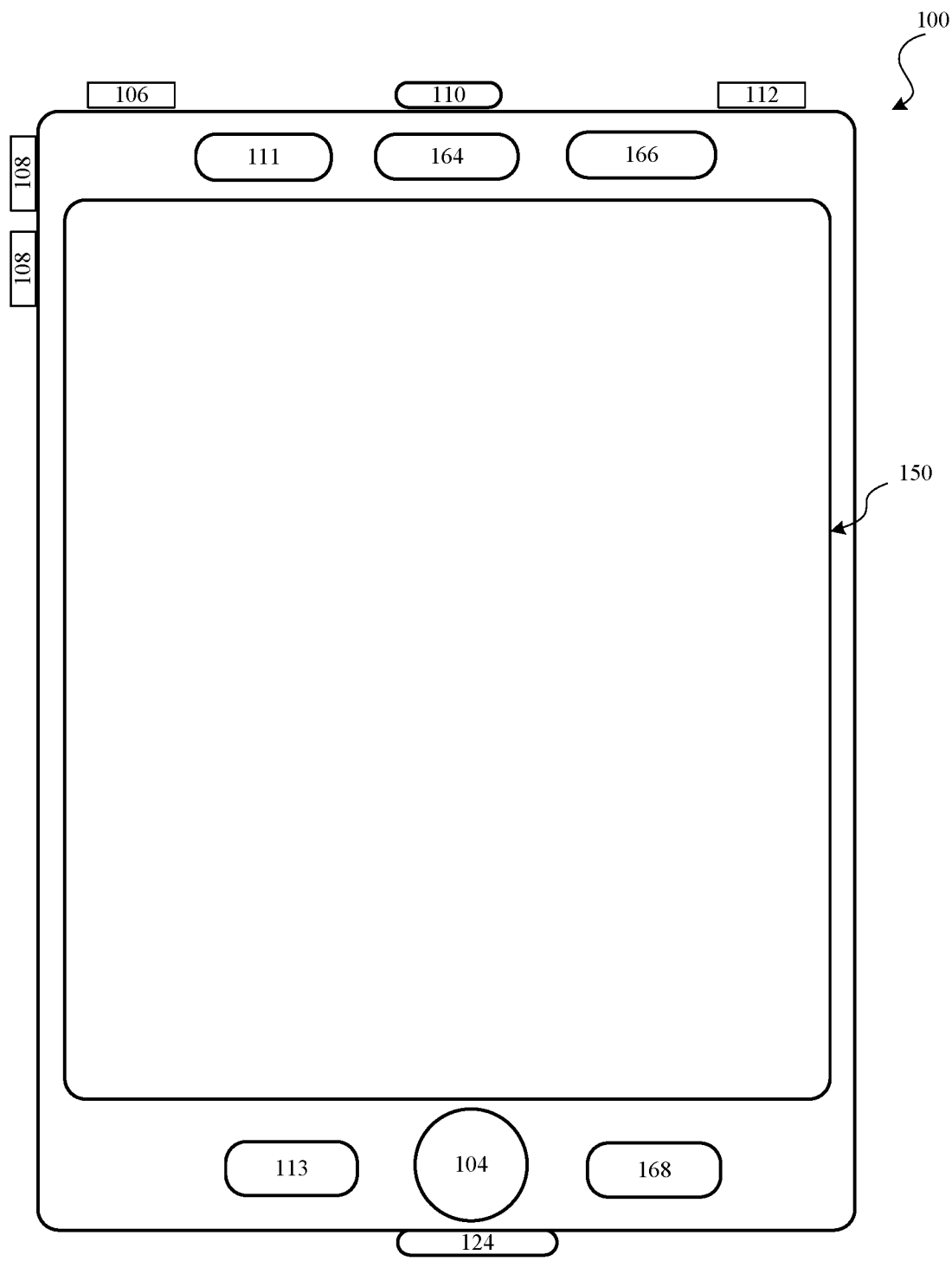
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate a configurable convolution engine for performing convolution and per-channel machine learning operations of input data of various channels in a desired manner by configuring operations of the components in the convolution engine. The convolution engine is a circuit that includes a first convolution circuit, a second convolution circuit, and a channel merge circuit coupled to the first and second convolution circuits. The first and second convolution circuits each generate a stream of values by applying convolution kernels to input data, among other things. The stream of values may each define one or more channels of image data in an interleaved manner. The channel merge circuit can combine the streams of values from the first and second convolution circuits in accordance with a selected mode of operation. In a dual-convolution mode, the streams of values are combined into a single output stream having the channels from the first stream and the channels from the second stream arranged in an interleaved manner.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
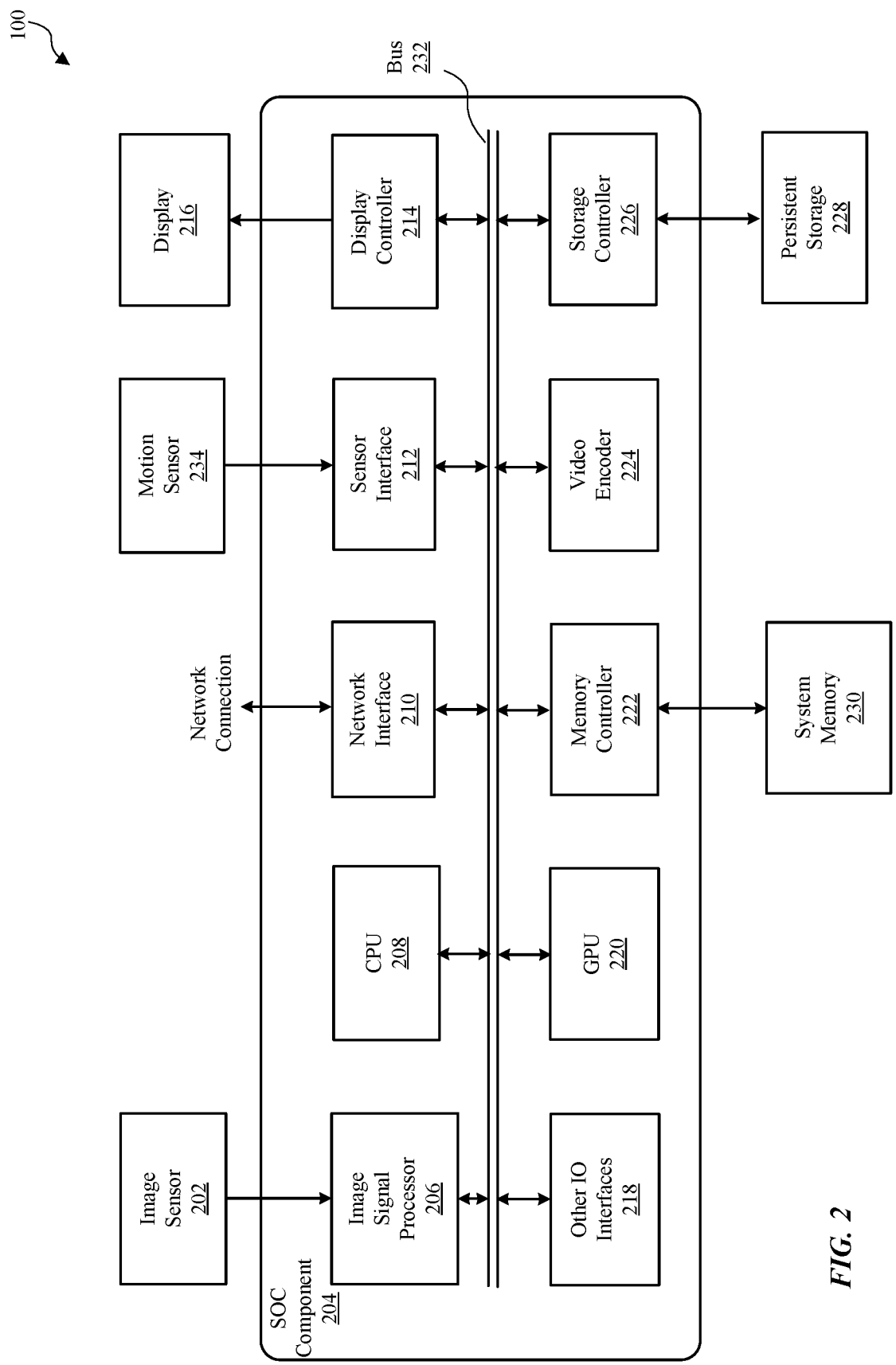
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), NAND or NOR flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 108 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
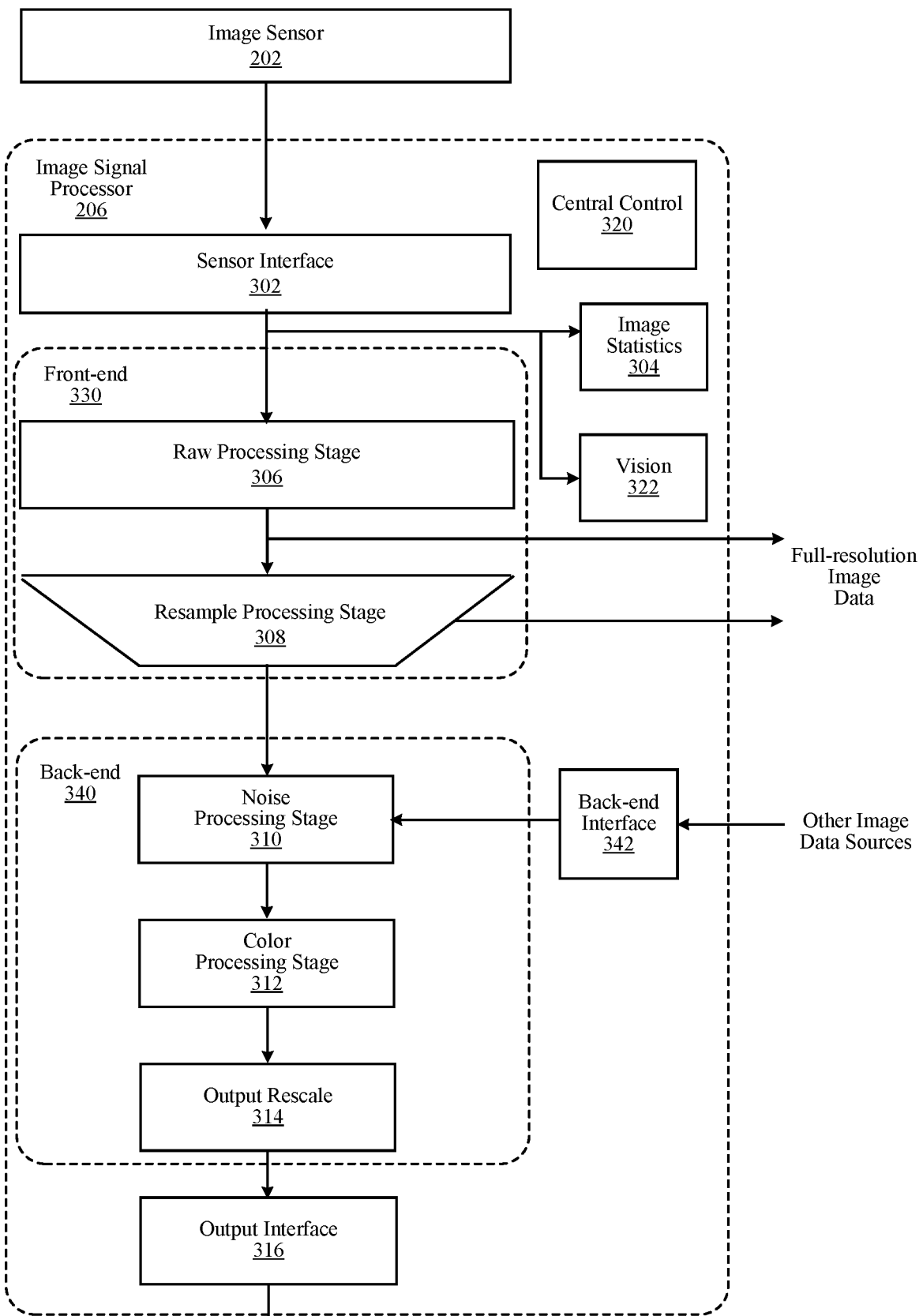
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle). Although embodiments described herein include embodiments in which the one or more back-end pipeline stages 340 process image data at a different rate than an initial data rate, in some embodiments back-end pipeline stages 340 may process image data at the initial data rate.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor 202 and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 308 may process image data in a Bayer raw format.

The operations performed by raw processing stage 308 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control 320 may control and coordinate overall operation of other components in ISP 206. Central control 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control 320 may update programmable parameters for other components in ISP 206 while the other components are in an idle state. After updating the programmable parameters, central control 320 may place these components of ISP 206 into a run state to perform one or more operations or tasks. Central control 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. Convolution may be used in image/video processing and machine vision. Convolution may be performed, for example, to generate edge maps of images or smoothen images. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Vision Module

Figure 4:
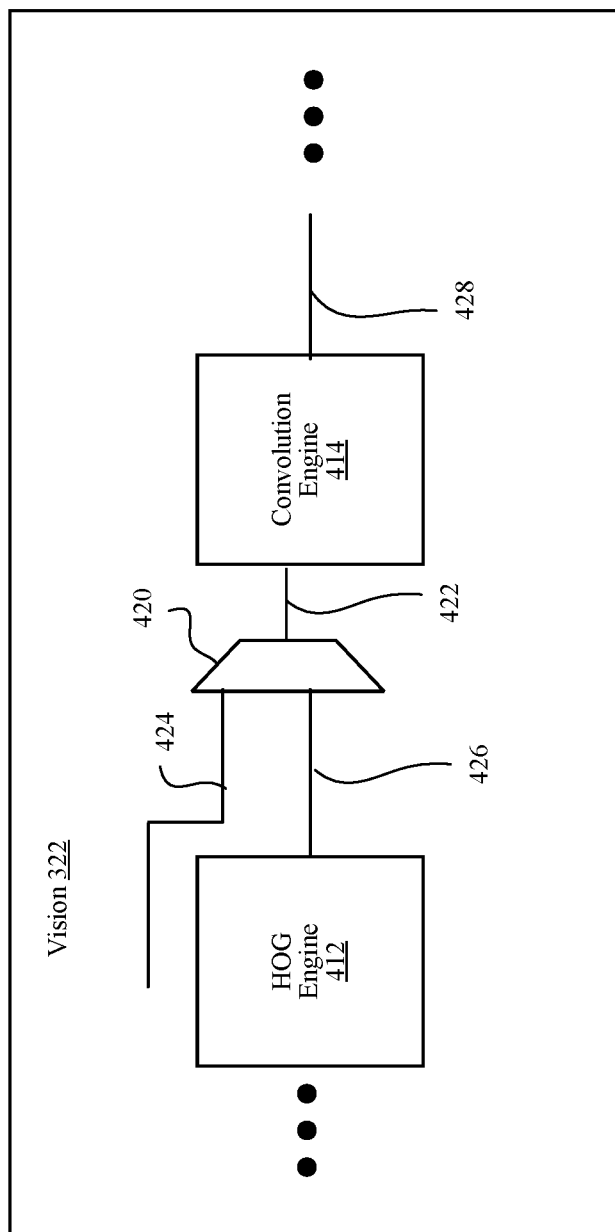
FIG. 4 is a block diagram illustrating a vision module in the image signal processor, according to one embodiment.

The vision module 322 performs various operations to facilitate computer vision operations at CPU 208, as described above with reference to FIG. 3. For this purpose, the vision module 322 may include, among other components, a histogram of oriented gradients (HOG) module 412, a multiplexer 420 and a convolution engine 414, as illustrated in FIG. 4. The vision module 322 may include other components not illustrated in FIG. 4 such as a scaling module.

The HOG engine 400 processes images to generate HOG data 426 for each image. An example of HOG data 426 is a histogram-of-oriented gradients that is generated for an image based on identified gradient orientations within the image. The HOG data 426 can be used in various computer vision applications such as image classification, scene detection, facial expression detection, human detection, object detection, scene classification, and text classification.

The multiplexer 420 receives the HOG data 426 from the HOG engine 412 and pixel data 424 from a component of image processing processor 206 other than the HOG engine 412 (e.g., DRAM memory), and selects either HOG data 426 or pixel data 424 as input data 422 to be forwarded to the convolution engine 414 according to various modes of operation. In one mode, the multiplexer 420 may forward the HOG data 426 to the convolution engine 414 as the input data 422. In another mode, the multiplexer 420 may forward the pixel data 424 to the convolution engine 414 as the input data 422 for performing operations such as sharpening, blurring and edge detection. A configuration signal for controlling the multiplexer 420 may be received from the central control 320. The pixel data 422 is a stream of interleaved pixel values of multiple channels.

The convolution engine 414 is a configurable circuit that performs convolution operations on the input data 422. For this purpose, the convolution engine 414 includes components for storing convolution kernel information, for performing calculation and for accumulating the multiplied values to generate an output 428, as described below in detail with reference to FIG. 5.

The structure of vision module 322 as illustrated in FIG. 4 is merely illustrative and various changes may be made to the structure of FIG. 4. For example, components such as HOG engine 412 and the multiplexer 420 may be omitted. Alternatively, the multiplexer 420 may receive pixel data from more than two sources and select one source for input to the convolution engine 414 as the stream input data 422.

In the following description, it is assumed that the input data 422 is pixel values for the sake of explanation. But it is to be noted that the input data 422 may be other types of data (e.g., HOG data) suitable for the convolution operation.

Example Convolution Engine Architecture

Figure 5:
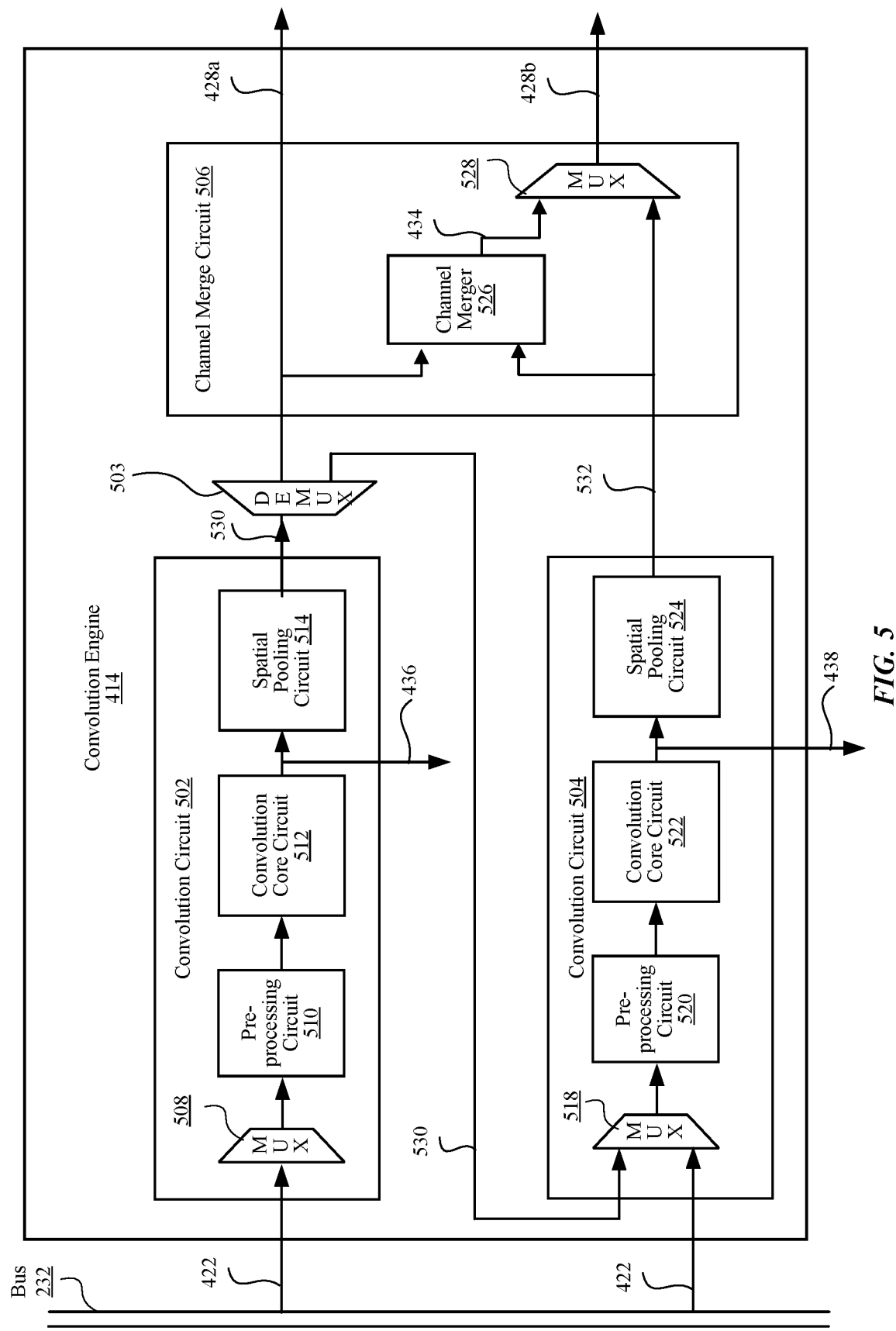
FIG. 5 is a block diagram of a convolution engine, according to one embodiment.

FIG. 5 is a block diagram illustrating the convolution engine 414, according to one embodiment. The convolution engine 414 is a circuit that performs operations on interleaved multi-channel image data to facilitate image/video processing and computer vision. The convolution engine 414 may performs various types of operations on the multi-channel image data such as convolution operations, inter-channel processing operations, and per-channel processing operations. Example convolution operations may include generating edge maps or smoothed images. For example, an image convolved with a Gaussian kernel may produce a smooth image with reduced noise and aliasing. In another example, the convolution engine 414 generates image features such as Gabor features for classification when an image is convolved with a set of multiple directional convolution kernels. Further, in some embodiments, the convolution engine 414 facilitates template matching for deep machine learning classification tasks, such as person or object detection.

The convolution engine 414 performs various operations to facilitate convolutional neural network (CNN) tasks, such as spatial pooling and local response normalization. A CNN is a deep learning architecture that can perform image classification, object detection, and other computer vision tasks.

The convolution engine 414 receives the input data 422, such as from the bus 232, and performs the convolution operation on the input data 422 based on stored convolution kernel information, performs inter-channel and per-channel processing on the result of the convolution operation, and generates the output data 428.

The convolution engine 414 may include, among other components, a first convolution circuit 502, a demultiplexer circuit 503, a second convolution circuit 504, and a channel merge circuit 506. Although convolution engine 414 is illustrated as including first convolution circuit 502 and second convolution circuit 504, in some embodiments, the convolution engine 414 may include N convolution circuits. The first convolution circuit 502 receives the stream of input data 422, and applies one or more convolution kernels to the input data 422 to generate a stream of values 530. The second convolution circuit 504 also receives the stream of input data 422 (or alternatively, the stream of values 530 output from the first convolution circuit 502), and applies one or more convolution kernels to the input data 422 to generate a stream of values 532. The streams of input data received and processed by the convolution circuits 502 or 504 each define one or more channels of the input data in an interleaved manner.

The first convolution circuit 502 includes a multiplexer 508, a pre-processing circuit 510, a convolution core circuit 512, and a spatial pooling circuit 514. The multiplexer 508 is coupled to the pre-processing circuit 510, the pre-processing circuit 510 is coupled to the convolution core circuit 512, and the convolution core circuit 512 is coupled to the spatial pooling circuit 514.

The multiplexer 508 receives the input data 422 from the bus 232 and provides the input data 422 to the pre-processing circuit 510. In some embodiments, the multiplexer 508 selects between the input data 424 from the bus 232 and one or more other data sources (e.g., the HOG data 426), and provides the selected data to the pre-processing circuit 510. In other embodiments, the multiplexer 508 is omitted from the first convolution circuit 502, and the pre-processing circuit 510 receives the input data 424 from the bus 232.

The pre-processing circuit 510 performs pre-processing operations on the interleaved input data 422, such as by applying gain, offset, and clipping operations to the input data 422 These operations can be used to apply various types of processing prior to convolution such as mean subtraction or contrast stretching. In some embodiments, the pre-processing circuit 510 identifies the values for each channel from the stream of input data 422, and handles each channel independently to apply different gains, offsets, or clipping operations to the input values of different channels. For example, the input data 422 may be in the Bayer raw format including interleaved Gr, R, B, and Gb channels. The pre-processing circuit 510 can apply different gains, offsets, or clipping operations to the pixel data of different channels. In some embodiments, the pre-processing circuit 510 operates in a bypass mode that passes the input to the convolution core circuit 512 without applying a pre-processing operation.

The convolution core circuit 512 receives the pre-processed input data from the pre-processing circuit 510, and applies one or more convolution kernels to the input data. The convolution core circuit 512 can also perform post-processing on the convolution results. The post-processing may include operations that produce values derived for deep machine learning such as multi-channel normalized cross correlation (NCC) or inter-channel local response normalization (LRN). A multi-channel or inter-channel operations combines values from two or more channels for a convolution result. The sequence of values in the stream generated by the convolution core circuit 512 defines multiple channels of data in an interleaved manner. The result of the convolution core circuit 512 is provided to the spatial pooling circuit 514. In some embodiments, the result of the convolution core circuit 512 is output from the convolution engine 414 as shown by the stream of values 436.

The spatial pooling circuit 514 performs per-channel operations, such as per-channel spatial pooling and per-channel local response normalization (LRN), to the output of the convolution core circuit 512, and outputs a stream of values 530. Per-channel operations process values associated with each channel individually. Per-channel LRN normalizes the local contrast in response maps. Per-channel operations may be applied after convolution layers to facilitate deep machine learning. The per-channel operations of the spatial pooling circuit 514 have lower computational cost compared to convolution layers because they are usually applied in smaller local windows and do not use convolution kernel coefficients.

The second convolution circuit 504 includes a multiplexer 518, a pre-processing circuit 520, a convolution core circuit 522, and a spatial pooling circuit 525. The discussion above regarding the first convolution circuit 502 may be applicable to the second convolution circuit 504, and any other convolution circuits that may be included in convolution engine 414. The MUX 518 selects between the stream of values 530 output from the first convolution core circuit 502 and the input values 422 from the bus 232, and sends the selected input to the pre-processing circuit 520. The second convolution circuit 504 can apply similar operations to either the stream of values 530 or the stream of input values 424 because both streams include channels of data in an interleaved manner. The operations and functions of pre-processing circuit 520, the convolution core circuit 522 and the spatial pooling circuit 524 are substantially the same as the pre-processing circuit 510, the convolution core circuit 512 and the spatial pooling circuit 514, and therefore, the detailed description of these circuits are omitted herein for the sake of brevity.

The demultiplexer circuit 503 is a circuit that receives the stream of values 530 and routes the output to either the channel merge circuit 506 or the second convolution circuit 504. The demultiplexer 503 can select the routing based on instructions from the central control 320. The central control 320 sets the selection of the demultiplexer 503 based on the mode of operation between a cascade mode where the convolution circuits 502 and 504 operate in series, and other modes where the convolution circuits 502 and 504 operate in parallel. In some embodiments, the demultilpexer circuit 503 is omitted from the convolution engine 414.

The channel merge circuit 506 has an input coupled to the output of the first convolution circuit 502 and another input coupled to the output of the second convolution circuit 504. The channel merge circuit 506 receives the streams of values 530 and 532 from the convolution circuits 502 and 504, respectively, and combines the values into one or more output streams of output values 428, such as the streams of values 428a and 428b. The streams of values received from the convolution circuits 502 and 504 may be processed in various ways depending on the mode of operation selected for the convolution engine 414, as discussed in greater detail below in connection with FIGS. 6A through 6C.

The channel merge circuit 506 includes a channel merger 526 and a multiplexer 528. The channel merger 526 receives the stream of values 530 from the first convolution core circuit 502 and the stream of values 532 from the second convolution core circuit 504, and interleaves the values 530 and 532 to generate a stream of values 534. The stream of values 534 include the channels from the stream of values 530 and the channels from the stream of values 532, as combined in an interleaved manner by the channel merger 526.

The multiplexer 528 has an input coupled to the stream of values 534 from the channel merger 526, and an input coupled to the stream of values 532 from the second convolution core circuit 504. The multiplexer 528 selects between the stream of values 534 and the stream of values 532 for output as the stream of values 428b. The channel merge circuit 506 also can output the stream of values 530 from the first convolution circuit 502 as the stream of values 428a.

Convolution Engine Processing Modes

The convolution engine 414 operates in multiple modes including a dual-convolution mode, a cascade mode, and a parallel mode. The central control 320 sends configuration information to the convolution engine 414 that configures the convolution engine 414 to operate in a specified mode. The configuration information includes instructions to the components of the convolution engine 414. The configuration information may also specify the inputs and functionality for the components, such as the convolution kernels used by each convolution circuit 502 and 504.

Figure 6A:
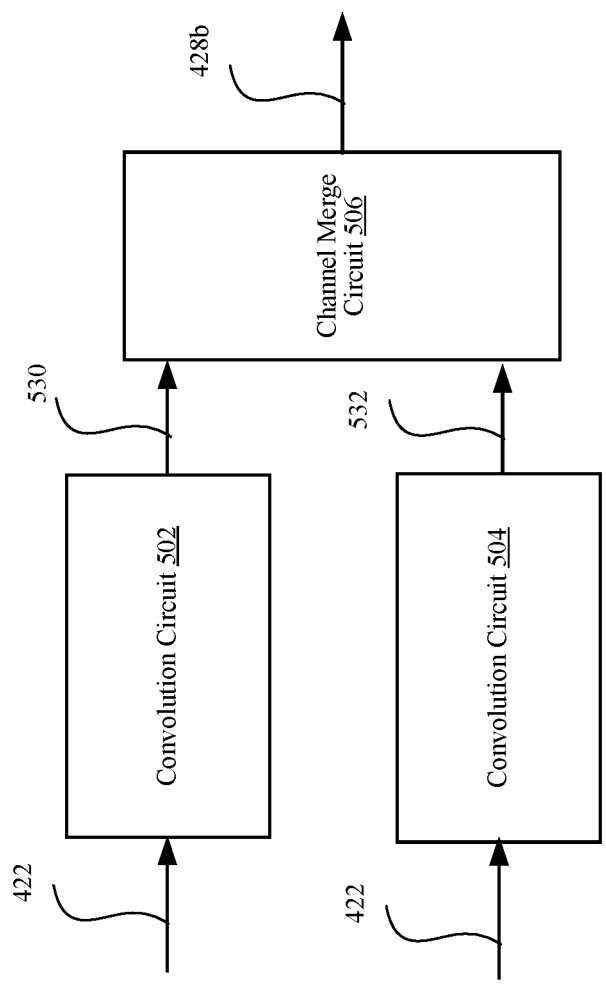
FIG. 6A is a block diagram of a dual-convolution mode of the convolution engine, according to one embodiment.

FIG. 6A is a block diagram illustrating the dual-convolution mode of the convolution engine 414, in accordance with one embodiment. In the dual convolution mode, the convolution circuits 502 and 504 operate in parallel by applying different convolution kernels to the same input data 424, and the channel merge circuit 506 combines the results from the convolution circuits 502 and 504 to generate the output stream of output values 428b. The properties associated with each convolution kernel may include filter element values, the kernel size (e.g., height and width in pixels of a window defined by the kernel) of the convolution kernel, sparsity values of the convolution kernel, and step value between convolutions. The stream of values 530 output from the first convolution circuit 502 and the stream of values 532 output from the second convolution circuit 504 are input to the channel merge circuit 506. The channel merge circuit 506 generates the output stream of output values 428b by interleaving the output values 530 and 532. The output stream of values 428b is output from the convolution engine 414 in the dual-convolution mode.

In some embodiments, the central control 320 sets the convolution engine 414 to the dual-convolution mode by controlling the selection by multiplexers 508, 518, 528 and demultiplexer 503 to route data streams. The demultiplexer 503, if used, routes the stream of values 530 to the channel merge circuit 506, which is output as the output stream of output values 428a. The multiplexer 518 selects the stream of values 530 output from the first convolution circuit 502 as the input for the second convolution circuit 504. The multiplexer 528 selects the stream of values 534 output from the channel merger 526 for the output stream of output values 428b. The multiplexer 508, if used, selects the input data 424 from the bus 232 as input for the first convolution circuit 502.

The dual-convolution mode is a configuration of the convolution engine 414 that processes the same input stream in parallel on two convolution core circuits 502 and 504. The convolution circuits 502 and 504 may apply different convolution kernels to the input data. To facilitate calculation of many output channels, the convolution engine 414 distributes the processing task between the convolution circuits 502 and 504. For example, first the convolution circuit 502 may process a first half of output channels while the second convolution circuit 504 may process a second half of the output channels. The channel merge circuit 506 combines the streams of multiple channels from convolution circuits 502 and 504 into a single stream having channels from both streams interleaved with each other.

In some embodiments, each convolution circuit 502 and 504 has two execution clusters that each generate one pixel value per clock (ppc). Each convolution circuit 502 and 504 thus generates two ppc. The channel merge circuit 506 combines the results of the convolution circuits 502 and 504 to generate a four ppc output after channel merging in the dual-convolution mode.

Figure 6B:
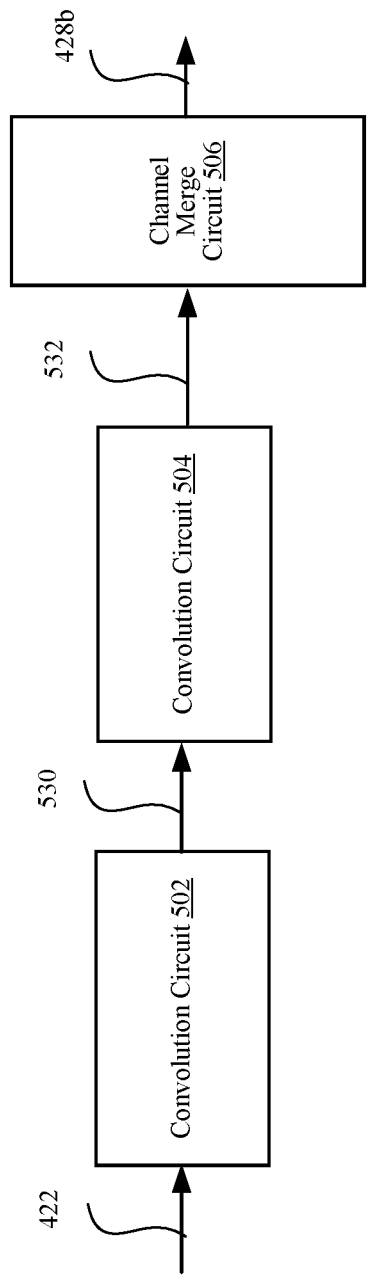
FIG. 6B is a block diagram of a cascade mode of the convolution engine, according to one embodiment.

FIG. 6B is a block diagram illustrating the cascade mode of the convolution engine 414, in accordance with one embodiment. In the cascade mode, the convolution circuits 502 and 504 operate in series. The first convolution circuit 502 applies one or more convolution kernels to the input data 422 from the bus 232 to generate the stream of values 530. The second convolution circuit 504 receives the stream of values 530 and applies one or more second convolution kernels to the values 530 to generate the stream of values 532. The convolution circuits 502 and 504 may use different convolution kernels. The channel merge circuit 506 generates the output stream of output values 428b by passing through the stream of values 532 from the convolution circuit 504.

The central control 320 sets the convolution engine 414 to the cascade mode by controlling the selection by the multiplexers 508, 518, 528 and the demultiplexer 503. The multiplexer 508, if used, selects the input data 424 from the bus 232 as input for the first convolution circuit 502. The demultiplexer 503, if used, routes the stream of values 530 to the multiplexer 518. The multiplexer 518 selects the stream of values 530 output from the convolution engine 414 as the input for the second convolution circuit 504. The multiplexer 528 selects the stream of values 532 output from the second convolution circuit 504 for the output stream of output values 428b.

In the cascade mode, the convolution circuits 502 and 504 perform two convolution operations in series without making memory transfer between the operations. The first convolution circuit 502 in the cascade generates one ppc, such as by using only one of two execution clusters. If the first convolution circuit 502 generates a two ppc output stream, the subsequent second convolution circuit 504 would need to two process four ppc. As such, a single execution cluster is used in the first convolution circuit 502 to generate the one ppc stream that is input to the second convolution circuit 504. The second convolution circuit 504 generates a two ppc output stream from the one ppc stream of the first convolution circuit 502.

Figure 6C:
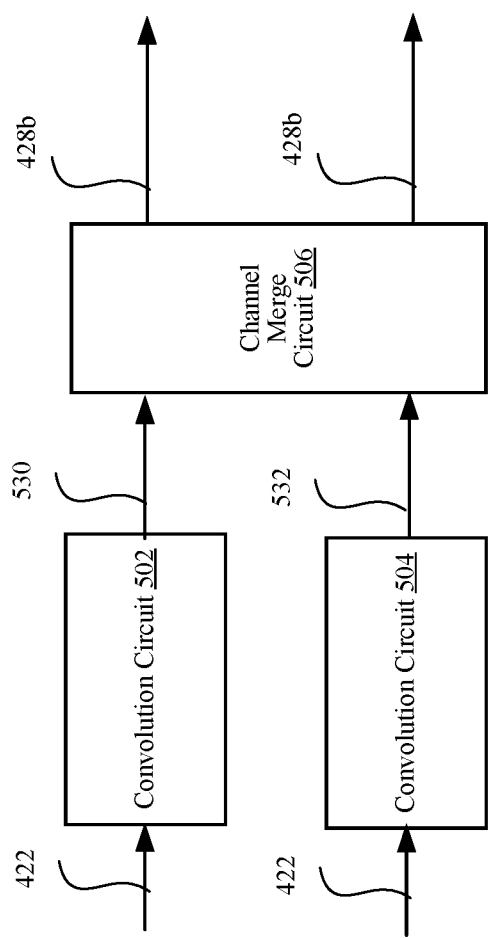
FIG. 6C is a block diagram of a parallel mode of the convolution engine, according to one embodiment.

FIG. 6C is a block diagram illustrating the parallel mode of the convolution engine 414, in accordance with one embodiment. In the parallel mode, the convolution circuits 502 and 504 operate as two single units in parallel to generate two separate interleaved output streams. For example, an image may be split into two vertical strips, and each convolution circuit 502 and 504 processes one strip. The convolution circuits 502 and 504 may process the same input data or different input data. When the input data is the same, the convolution circuits 502 and 504 may apply different convolution kernels to the input data. In another example, the convolution circuits 502 and 504 apply different kernels to different input data.

The first convolution circuit 502 applies one or more convolution kernels to the input data 422 from the bus 232 to generate the stream of values 530. The second convolution circuit 504 applies one or more second convolution kernels to the input data 422 from the bus 232 to generate the stream of values 532. The channel merge circuit 506 generates the output stream of output values 428a by passing through the stream of values 530, and generates the output stream of output values 428b by passing through the stream of values 532. The separate output streams 428a and 428b may each define multiple channels of data in an interleaved manner. In the parallel mode, the outputs from the convolution circuits 502 and 504 are kept in separate streams of interleaved channels rather than being combined into a single stream of interleaved channels.

The central control 320 sets the convolution engine 414 to the parallel mode by controlling the selection at the multiplexers 508, 518, 528 and the demultiplexer 503. The multiplexer 508, if used, selects the input data 422 from the bus 232 as input for the first convolution circuit 502. The demultiplexer 503, if used, routes the stream of values 530 from the output of the first convolution circuit 502 to the channel merge circuit 506 for output as the output stream of output values 428a. The multiplexer 518 selects the input data 422 from the bus 232 as the input for the second convolution circuit 504. The multiplexer 528 selects the stream of values 532 output from the second convolution circuit 504 for the output stream of output values 428b of the channel merge circuit 506. The channel merge circuit 506 also passes the stream of values 530 to the output stream of output values 428a.

In the parallel mode, each convolution circuit 502 and 504 may generate two ppc using two execution clusters. The channel merge circuit 506 outputs the first stream from the first convolution circuit 502 at two ppc, and the second stream from the second convolution circuit 504 at two ppc.

Figure 7:
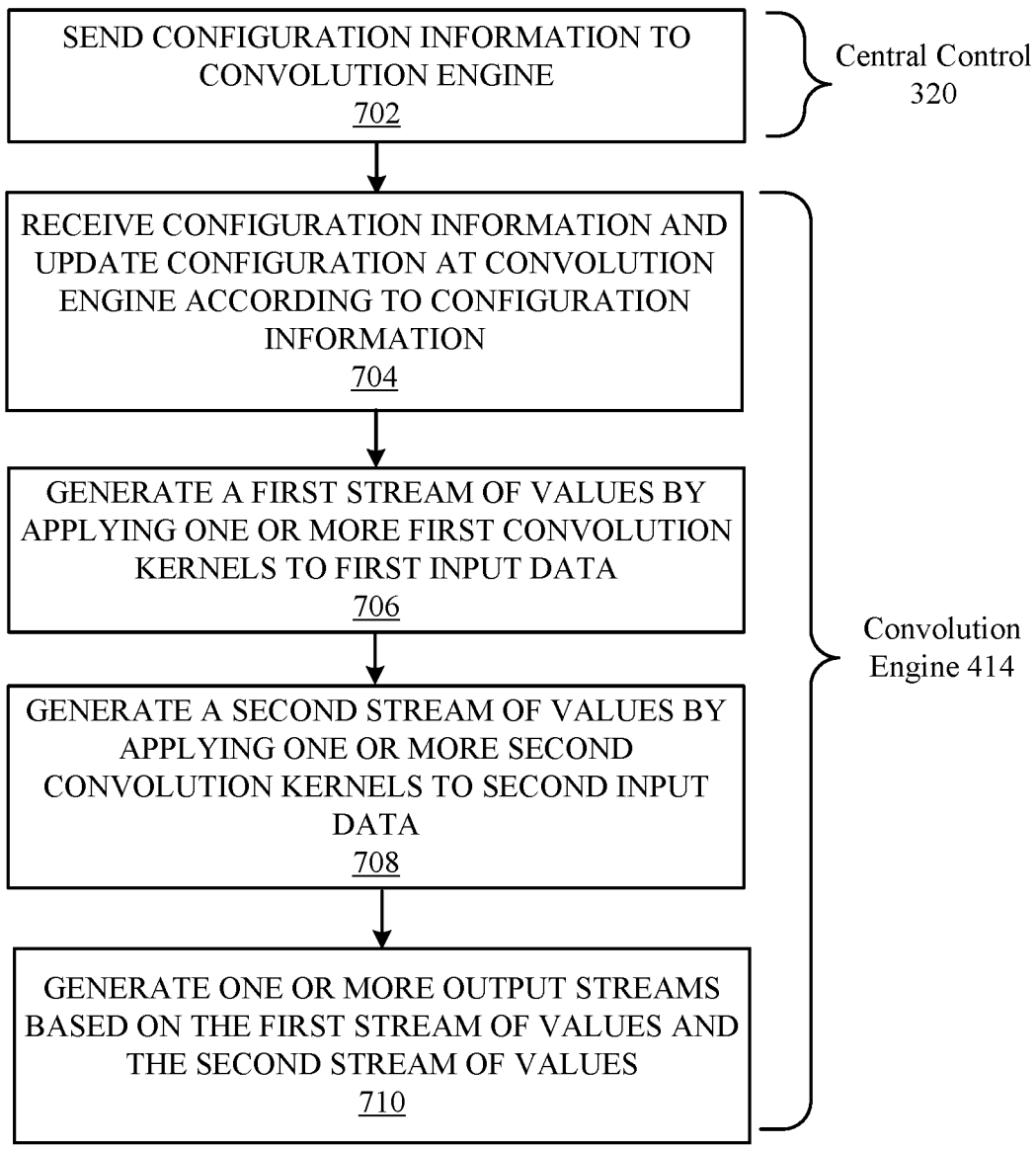
FIG. 7 is a flow chart illustrating a method of operating the convolution engine in a plurality of modes, in accordance with one embodiment.

FIG. 7 is a flow chart illustrating a method of operating the convolution engine 414 in a plurality of modes, in accordance with one embodiment. The central control 320 sends 702 configuration information to the convolution engine 414. The configuration information may include parameters for the components of the convolution engine that place the convolution engine in a particular mode of operation, such as the dual-convolution mode, cascade mode, or serial mode.

The configuration information may further include information defining the stream of values input to each convolution core circuit 502 and 504. For example, the configuration information may define image size and/or channel count such that the components of the convolution engine 414 can identify pixels of each channel from a serial stream.

The configuration information may further include information defining the one or more convolution kernels used by each convolution core circuit 502 and 504, such as filter element values, kernel size, sparsity values, and step values. The configuration information defining convolution kernels specifies the convolution operations executed by each convolution core circuit 502 and 504.

After receiving the configuration information, the configuration of the convolution engine 414 is updated 704 according to the configuration information to perform operations as described in the configuration information. Updating the configuration may include routing streams within the convolution engine according to the selected mode of operation. The routing control may be set using the multiplexers 508, 518, and 528 of the convolution engine 414, as discussed above in connection with FIGS. 6A through 6C. Updating the configuration may include providing convolution kernels to the convolution circuits 502 and 504. The convolution circuits 502 and 504 may also be configured use one or two execution clusters depending on the mode of operation as discussed above.

In some embodiments, the configuration instructions may further define one or more deep learning operations performed on the convolution results at each convolution circuit 502 and 504 prior to channel merging. Example operations may include normalized cross correlation calculation, response rectification, spatial pooling, and local response normalization. In some embodiments, inter-channel operations may be performed by the post-processing circuit 704 of the convolution core circuits 502 and 504, while per-channel operations are performed by the spatial pooling circuits 514 and 524.

The first convolution circuit 502 of the convolution engine 414 generates 706 a first stream of values by applying one or more first convolution kernels to first input data. The second convolution circuit 504 of the convolution engine 414 generates 708 a second stream of values by applying one or more second convolution kernels to the second input data. Generating the first and second input data may include performing convolutions, and may also include applying one or more deep learning operations with the post-processing circuitry of the convolution core circuit 512/522, or the spatial pooling circuitry 514/524.

In the dual-convolution mode, the first and second input data used by the convolution circuits 502 and 504 may be same, and the first and second convolution kernels may be different. In the cascade mode, the second input data used by the second convolution circuit 504 is the output of the first convolution circuit 502, and the first and second convolution kernels may be different. In the parallel mode, the first and second input data may be the same and the first and second convolution kernels may be different.

The channel merge circuit generates 710 one or more output streams based on the first stream of values from the first convolution circuit 502 and the second stream of values from the second convolution circuit 504. In the dual-convolution mode, the channel merge circuit 710 generates the output stream by combining the interleaved first stream of interleaved channel values from the first convolution circuit 502 and the second stream of interleaved channel values from the second convolution circuit 504 in an interleaved manner. In the cascade mode, the channel merge circuit 710 generates an output stream including the second stream of interleaved channel values from the second convolution circuit 504, where the second stream of interleaved channel values are derived by applying the one or more second convolution kernels to the first stream of interleaved channel values at the second convolution circuit 504. In the serial mode, the channel merge circuit 710 generates a first output stream including the first stream of interleaved channel values from the first convolution circuit 502 and a separate second output stream including the second stream of interleaved channel values from the second convolution circuit 504.

The process as illustrated in FIG. 7 is merely illustrative and various changes can be made to the process. For example, generating 706 the first stream of values and generating 708 the second stream of values may be performed in parallel or in series, as specified by the configuration information and mode of operation of the convolution engine 414.

Convolution Core Circuit

Figure 8:
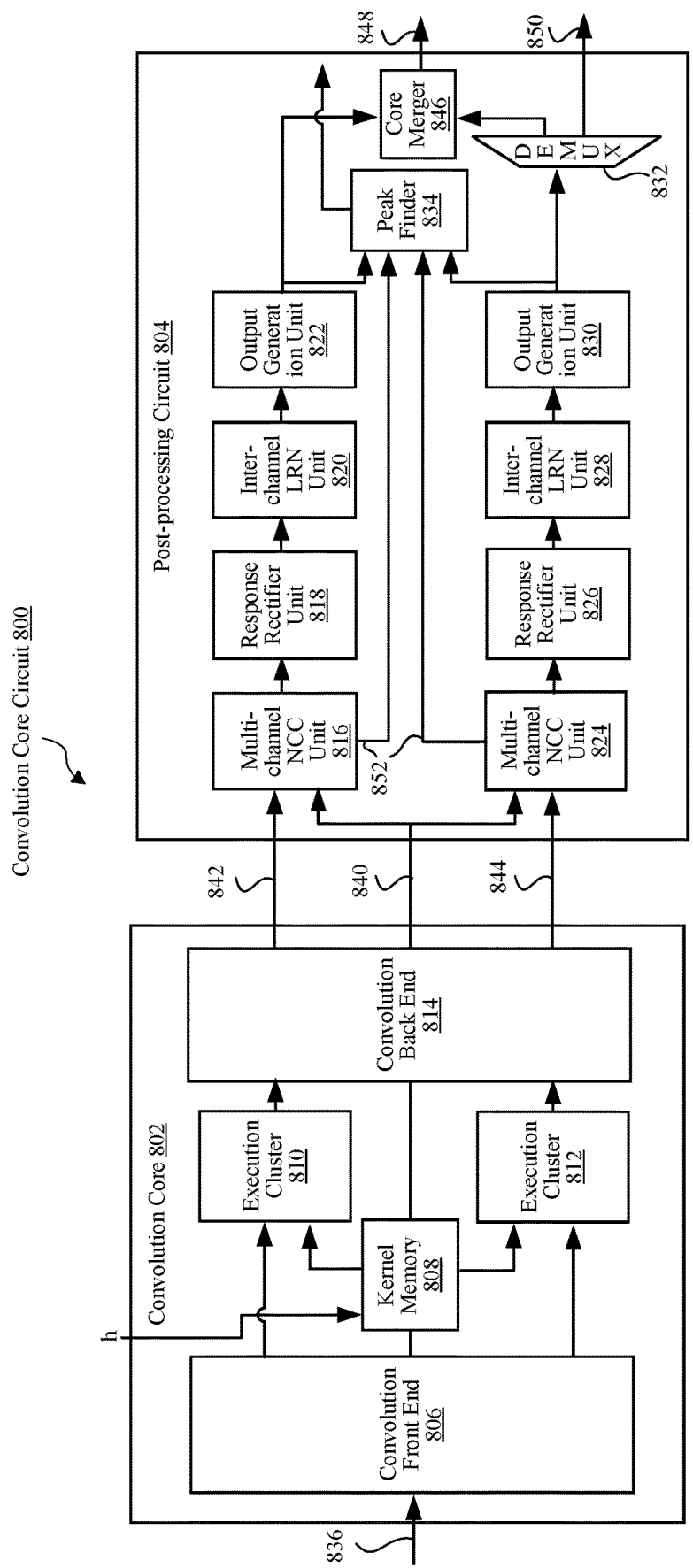
FIG. 8 is a block diagram illustrating a convolution core circuit, in accordance with one embodiment.

FIG. 8 is a block diagram illustrating a convolution core circuit 800, in accordance with one embodiment. The convolution core circuit 800 is an example of the convolution core circuit 512 of the first convolution circuit 502, or the convolution circuit 522 of the second convolution circuit 504, as shown in FIG. 5. The convolution core circuit 800 includes a convolution core 802 and a post-processing circuit 804. The convolution core 802 receives input data 836, and performs convolution operation by applying one or more convolution kernels h to the input data 836. The input data 836 may be the input data 422 from the bus 323, the output of another convolution circuit, or input data from some other source, and may be pre-processed by the pre-processing circuit 510 as discussed above. The post-processing circuit 804 performs post-processing on the outputs of the convolution core 802.

The convolution core circuit 802 includes a convolution front end 806, a kernel memory 808, an execution cluster 810, an execution cluster 812, and a convolution back end 814. The convolution front end 806 is coupled to the execution clusters 810 and 812. The convolution front end 806 receives the input data 836 and prepares the input data 836 for processing by the execution clusters 810 and 812. The convolution front end 806 distributes processing tasks involving the input data and a convolution kernel across the execution clusters 810 and 812.

Each execution cluster 810 and 812 is coupled to the convolution front end and the kernel memory 808. Each execution cluster 810 and 812 may include multiple multiply-and-accumulate (MAC) units. When multiple output channels are used, output channels with even indexes may be processed by one execution cluster while output channels with even indexes may be processed by the other execution cluster. Each execution cluster 810 and 812 can generate one ppc, and thus the convolution core 802 as a whole can generate two ppc. The execution cluster 810 generates a stream of even data values 842 including even index output channels and a stream of odd data values 844 including odd index output channels.

The kernel memory 808 stores one or more convolution kernels h that is provided to the execution clusters 810 and 812. In some embodiments, the central control 320 provides the one or more convolution kernels h to the kernel memory 808 to control the convolution operation. Each execution cluster 810 and 812 applies the convolution kernel from the kernel memory 808 to the input data 836 as prepared by the convolution front end 806. The execution clusters 810 and 812 may execute in parallel to generate output values, for example, at two ppc. In some embodiments, only a single execution cluster 810 or 812 is enabled to generate output values, for example, at one ppc.

In one example, the execution clusters 810 and 812 applies a series of convolution kernels to different portions of input data to generate the stream of even data values 842 including even index output channels and the stream of odd data values 844 including odd index output channels. The even data values 842 and odd data values 844 represent multi-channel data, which are separately processed in post-processing pipelines with inter-channel operations such as local response normalization and normalized cross correlation.

In some embodiments, the convolution front end 806 generates kernel statistics 840 for the convolution kernel that is stored into the kernel memory 808 and processed by the execution clusters 810 and 812. The kernel statistics may be derived from the properties of the convolution kernel. The kernel statistics 840 may include $\Sigma H$ and $\Sigma H^2$, where H is the kernel data of the convolution kernel. The convolution core 802 sends the kernel statistics 840 to the post-processing circuit 804.

The convolution back end 814 is coupled to the outputs of the execution clusters 810 and 812. The convolution back end 814 performs further processing of output values from each execution cluster. Such operations may include, but are not limited to, multi-cycle accumulation for large bit size data.

In some embodiments, the convolution back end 814 or some other component of the convolution core 802 generates local statistics based on the input data 836. The local statistics may include $\Sigma I$, $\Sigma I^2$, and $\Sigma I*H$, where I is the input data 836 and H is the convolution kernel applied to the input data 836. In some embodiments, the local statistics are transmitted via the stream of even data values 842 and the stream of odd data values 844 to the post-processing circuit 804. For example, the local statistics may be auxiliary channels of the streams 842 and 844, such as the last active channels of the multi-channel streams. In other embodiments, the local statistics may be transmitted in a stream with the kernel statistics 840, or in a separate stream.

The convolution core 802 thus generates the stream of even data values 842, the stream of odd data values 844, the kernel statistics 840, and local statistics. These values are provided to the post-processing circuit 804 for additional processing. An example circuitry of the convolution core 802 is discussed below in greater detail in connection with FIG. 10.

The post-processing circuit 804 includes a processing pipeline for each execution cluster 810 and 812 to handle the respective output streams 842 and 844. To process the stream 842 from the execution cluster 810, the post-processing circuit 804 includes a multi-channel normalized cross correlation (NCC) unit 816, a response rectifier unit 818, an inter-channel local response normalization (LRN) unit 820, and an output generation unit 822. To process the stream 844 from the execution cluster 812, the post-processing circuit 804 includes a multi-channel NCC unit 824, a response rectifier unit 826, an inter-channel LRN unit 828, and an output generation unit 830. The post-processing circuit 804 may further include a peak finder 843, a demultiplexer 832, and a core merger 846.

The multi-channel NCC unit 816 computes NCC scores and normalized kernel statistics for the stream of even data values 842. The multi-channel NCC unit 816 is coupled to the convolution core 802 to receive the stream of even data values 842, the local statistics, and the kernel statistics 840. The multi-channel NCC unit 816 determines the NCC score for each convolution kernel based on the even data values 842, the local statistics, and the kernel statistics 840.

The multi-channel NCC unit 816 may compute an NCC score for each convolution kernel. The NCC scores are normalized by the input variance as defined by the local statistics and by the variance of kernels as defined by the kernel statistics. The NCC scores can be used to find best correspondence between two frames.

For each convolution kernel, an NCC score may be defined by Equation 1:

$$NCCScore = \qquad\qquad\qquad\qquad\qquad\qquad (1)$$
$$E\left(\frac{I-m_I}{\sigma_I} \cdot \frac{H-m_H}{\sigma_H}\right) = \frac{N\sum IH - \sum I \sum H}{\sqrt{(N\sum I^2 - (\sum I)^2) \cdot (N\sum H^2 - (\sum H)^2)}}$$

where I is the input data, H is the kernel data, $M_I$ and $M_H$ are the mean of I and H, $\sigma_I$ and $\sigma_H$ are the standard deviations of I and H, and N is the size of the convolution kernel.

Additional scale and offset factors may be applied to avoid dividing by zero and to reduce quantization error.

The multi-channel NCC unit 816 may also compute normalized kernel statistics. For example, the multi-channel NCC unit 816 computes kernel statistics as defined by Equation 2:

$$(N\Sigma H^2 - (\Sigma H)^2) \quad (2)$$

where N is the size of the convolution kernel and H is the kernel data. Equation 2 forms part of the denominator of Equation 1, and thus the kernel statistics can be computed in the course of computing NCC scores.

The normalized kernel statistics is a scaled version of the kernel statistics processed using a scale factor. The scale factor may be defined by Equation 3:

$$\text{Scale Factor} = \frac{1}{N^2} \quad (3)$$

where N is the size of the convolution kernel. The scale factor normalizes the kernel statistics to be independent of the kernel size. The multi-channel NCC unit 816 sends the normalized kernel statistics 852 and/or NCC scores to the peak finder 834.

The response rectifier unit 818 is coupled to the multi-channel NCC unit 816. The response rectifier unit 818 receives the stream of data values 842 and performs a non-linear transformation to the data values 842. The non-linear transformation facilitates deep machine learning of description high-level features. The stream of data values 842 input to the response rectifier unit may be transmitted from the multi-channel NCC unit 816. In some embodiments, multi-channel NCC unit 816 is omitted from the post-processing circuit 804 and the response rectifier unit 818 receives the stream of data values 842 from an execution cluster.

Figure 9:
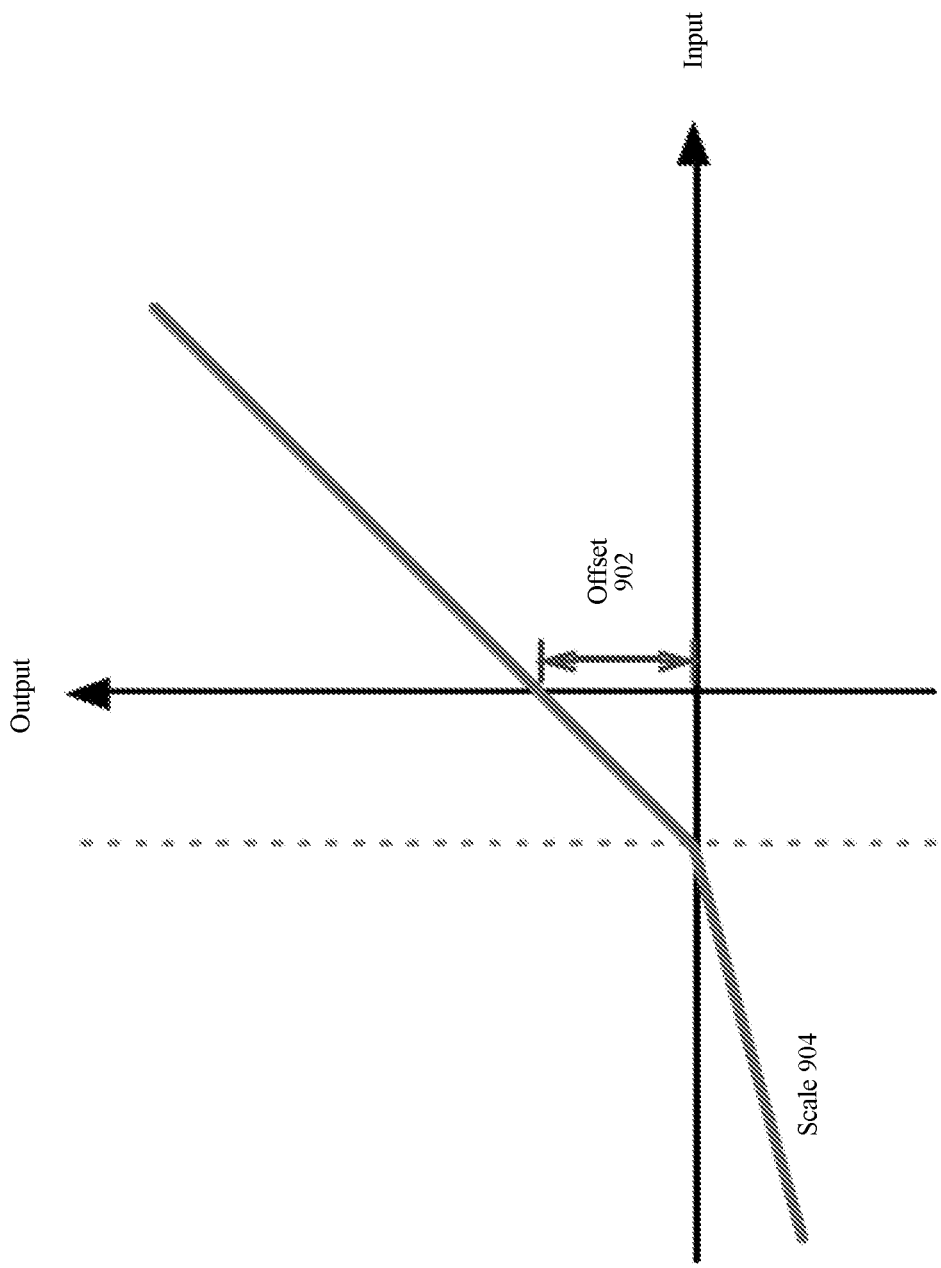
FIG. 9 is a plot of a non-linear transformation applied by the response rectifier unit, in accordance with one embodiment.

FIG. 9 is a plot of a non-linear transformation applied by the response rectifier unit 818, in accordance one some embodiment. The response rectifier unit 818 receives the stream of values 842 as input and applies an offset parameter 912 to the values 842. The offset parameter 912 may be selected to model a bias applied after convolution layers in deep learning architectures. After applying offset, the response rectifier unit 818 applies a scaling to negative input values based on a configurable scaling factor 904. The response rectifier unit 818 outputs a stream of rectified data values. In some embodiments, the response rectifier unit 818 clips negative values to 0. In other embodiments, response rectifier unit 818 converts negative values into positive values.

Referring back to FIG. 8, the response rectifier unit 818 may apply different offset and scaling parameters for different channels. The parameters of the response rectifier unit 818 may be specified by the central control 320. In some embodiments, the central control 320 may deactivate the response rectifier unit 818. Here, the response rectifier unit 818 may operate as a bypass for the stream of values in the post-processing pipeline. In some embodiments, the response rectifier unit 818 is omitted from the post-processing circuit 804.

The inter-channel LRN unit 820 is coupled to the response rectifier unit 818 and performs an inter-channel LRN to the output of the response rectifier unit 818. In particular, the inter-channel LRN unit 820 receives the stream of data values 842 and the local statistics, and performs local response normalization to generate a normalized convolution output stream of data values. The inter-channel LRN unit 820 facilitates processing used in deep learning architecture. The inter-channel LRN unit 1200 may perform fixed-point approximation of an operation defined by Equation 4:

$$x_i \rightarrow \frac{x_i}{\sqrt{1 + \alpha \frac{1}{N} \sum_{i'} x_{i'}^2}} \quad (4)$$

where $x_i$ is a pixel index value, $\alpha$ is the strength of normalization, $i'$ is the index of pixels inside a local window around $x_i$, and N is the number of pixels in the window. The support for a local window is inter-channel, and thus represented as a rectangular region in a planarized format. The inter-channel LRN unit 820 performs inter-channel LRN in the post-processing stage to leverage the serial streams of interleaved channels, while per-channel normalization is handled in a separately, such as by the spatial pooling circuit 514.

The output generation unit 822 is coupled to the inter-channel LRN unit 820. The output generation unit 822 applies a scale, offset, and shift to the output of the inter-channel LRN unit 820.

The post-processing pipeline for the stream of odd values 844 may operate substantially the same as the processing pipeline for the stream of even values 842 and therefore, the detailed description of these circuits are omitted herein for the sake of brevity.

The core merger 846 combines the even and odd streams 842 and 844 (e.g., subsequent to post-processing) having even and odd channels into a stream of data values 848 that includes the even and odd channels in an interleaved manner. The core merger 847 is coupled to the output generation unit 822 and the output generation unit 830.

The post-processing circuit 804 may further include a demultiplexer 832. The demultiplexer 832 is coupled to the output generation unit 830 and selectively provides the stream of values from the output generation unit 830 to the core merger 846 (for combination into the output stream 848) or as an output stream 850. The stream of values 848 combines pixel values from both the execution cluster 810 and 812, and thus the core merger 846 generates output, for example, at two ppc. The stream of values 850 is generated using only the values from the execution cluster 812, and thus may be generated, for example, at one ppc. As discussed above in connection with FIGS. 6A through 6C, the convolution core circuit 800 can be set to generate one ppc or two ppc in different modes of operation of the convolution engine 414.

The peak finder 834 is coupled to the multi-channel NCC unit 816 and the output generation unit 822 of the first post-processing pipeline, and coupled to the multi-channel NCC unit 824 and output generation unit 830 of the second post-processing pipeline. In some embodiments, the normalized kernel statistics can be used as a confidence measure for the reliability of a template matching result. The peak finder 834 receives the normalized kernel statistics 852 and the convolution results, and determines a location that provides a best match best match location for a template based on the NCC scores. The peak finder 843 determines a location based on predetermined criteria. For example, the peak finder 843 may find a minimum or maximum pixel location for a selected channel. When a list of high-dimensional feature vectors is given as input data, the peak finder may find the vector closest to the origin based on distance metric evaluated by convolution core.

In some embodiments, the peak finder 834 monitors the streams of data from the output generation units 822 and 830. For a selected channel, the peak finder 834 accesses each value of the channel in the streams to track the location that has a minimum or maximum value. The selected output channel may contain NCC scores or any other convolution results. If the channel contains NCC scores (e.g., the multi-channel NCC unit 816 is enabled for the selected channel), the peak finder 834 outputs normalized kernel statistics with the peak location and peak NCC score. If NCC is not enabled, the peak finder 834 outputs out the peak location and the peak value.

In some embodiments, the central control 320 sends configuration information to the convolution core 802 and the post-processing circuit 804 of the convolution core circuit 800. The configuration instructions may include post-processing instructions for each pipeline of each post-processing circuit 804, and define the post-processing to be applied to convolution results from the convolution core 802.

The post-processing instructions define whether the multi-channel NCC units, response rectifier units, inter-channel LRN units, or peak finder are enabled or disabled. In some embodiments, the post-processing circuit 804 operates in a plurality of modes as specified by the post-processing instructions. In an NCC mode, the multi-channel NCC units are enabled and the inter-channel LRN units are disabled. In a LRN mode, the multi-channel NCC units are disabled and the inter-channel LRN units are enabled. In a mixed LRN/NCC mode, the multi-channel NCC units and the inter-channel LRN units are enabled. In a passthrough mode, the multi-channel NCC units and the inter-channel LRNs unit are disabled. A disabled component in a post-processing pipeline may pass its input data stream to the next component in the post-processing pipeline without processing the stream.

Figure 10:
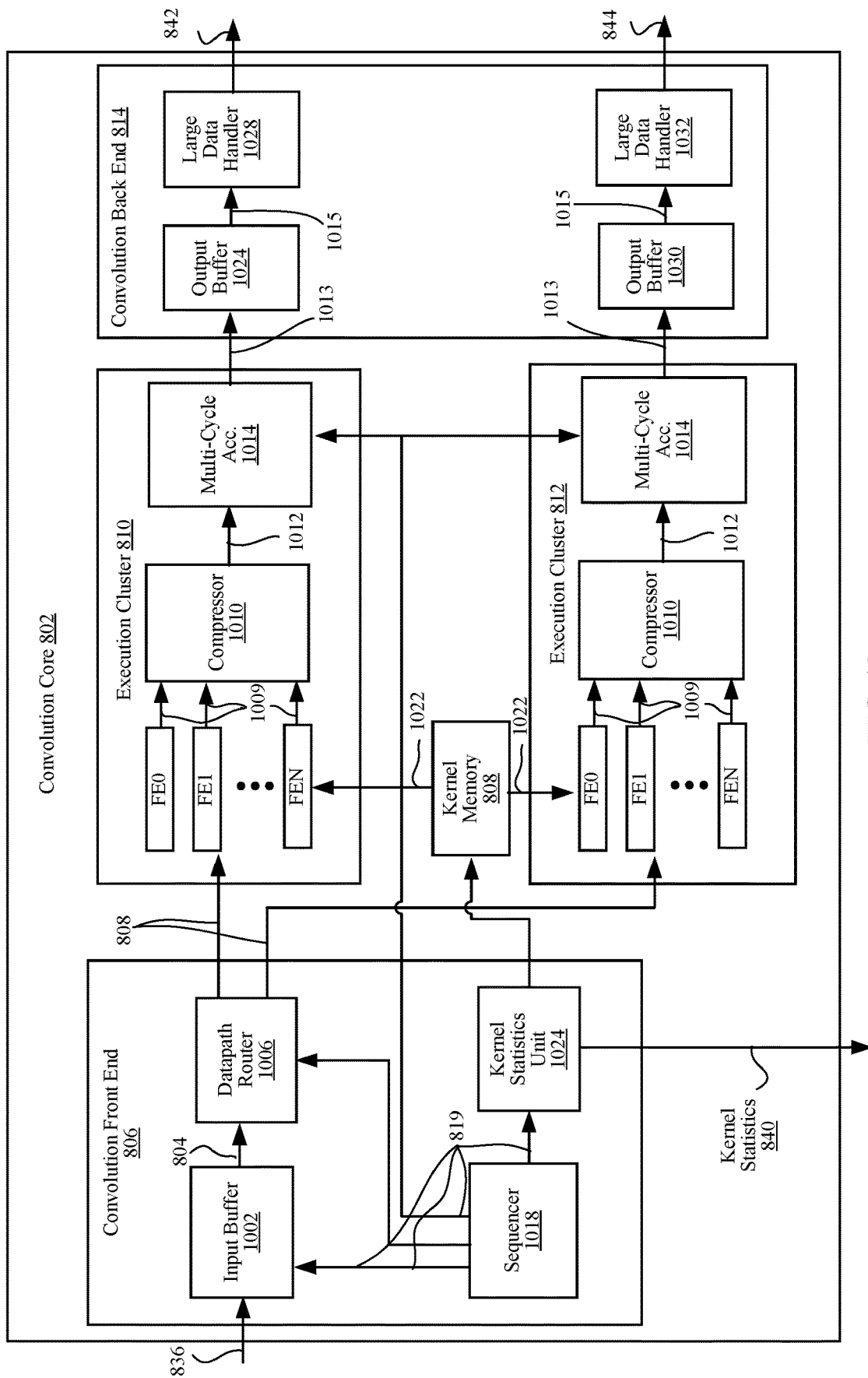
FIG. 10 is a block diagram illustrating a convolution core, in accordance with one embodiment.

FIG. 10 is a block diagram illustrating a convolution core 802, in accordance with one embodiment. As discussed above, the convolution core 802 includes circuitry such as the convolution front end 806, the execution clusters 810 and 812, and the convolution back end 814.

The convolution front end 806 may include an input buffer 1002, a datapath router 1006, a sequencer 1018, and a kernel statistics unit 1024. The input buffer 1002 stores the input data 836 as it is streamed into the convolution front end 806. The input data 836 may be a stream values with data of multiple input channels in an interleaved manner. The input data 836 may be pixel data, HOG data, an output of a previous cycle of the convolution circuit 800, an output of another convolution circuit 800, or other data received from other components of the device 100.

The datapath router 1006 is a circuit that reads a set of data 1004 in predetermined locations of the input buffer 1002 in a scan sequence and sends the read data 1008 to the execution cluster 810 or 812 for computation of convolved values. The datapath router 1006 may send different portions of the input data 836 to the execution cluster 810 and 812 for parallel processing with a convolution kernel. A scan sequence described herein refers to the operation of processing a subset of input data. The datapath router 1006 may perform reading and sending of data for multiple scan sequences within a processing cycle of the convolution engine 414 to populate the execution clusters 810 and 812 with pixel values. In one embodiment, the datapath router 1006 selectively reads the pixel values of a center pixel and pixel values for a subset of pixels neighboring the center pixel while skipping other neighboring pixels according to sparsity values. Furthermore, the center pixels to be processed within a scan sequence may be separated by a number of pixels defined by the step values. In a subsequent scan, a new set of center pixels separated by the same or different number of pixels may be processed.

The kernel memory 808 is a circuit that stores kernel information. The kernel information includes values for filter elements in convolution kernels, sparsity values, step values, kernel size, etc. The kernel information 1022 is sent to execution cluster 810 to populate register in multiplier circuits FE0 through FEN of the execution cluster 810. The kernel information 1022 is also sent to execution cluster 812 to populate register in multiplier circuits FE0 through FEN of the execution cluster 812. The kernel memory 808 may store a plurality of convolution kernels for performing convolution with different channels of pixel data and/or to perform convolution with the same channel of pixel data.

The execution clusters 810 and 812 are programmable circuits that performs computation operations. For this purpose, the execution clusters 810 and 812 may include the multiplier circuits FE0 through FEN, a compressor 1010 and a multi-cycle accumulator 1014. Each of the multiplier circuits FE0 through FEN may store a pixel value in the read data 1008 and a corresponding filter element value in the kernel memory 808. The pixel value and the corresponding filter element value are multiplied in the multiplier circuit to generate a multiplied value 1009. In some embodiments, the compressor 1010 receives the multiplied values 1009 and accumulates subsets of multiplied values 1009 to generate compressed values 1012. In other embodiments, instead of accumulating the subsets of multiplied values 1009, the compressor 1010 may select (i) a minimum value, (ii) a maximum value, or (iii) a median value from each subset of multiplied values 1009. The multi-cycle accumulator 1014 receives the compressed values 1012 and performs accumulation (or selection of a minimum value, a maximum value or a media value) on the compressed values 1012 generated across multiple processing cycles of the convolution core 802.

Returning to the convolution front end 806, the sequencer 1018 controls operations of other components of the convolution core 802 to perform multiple cycles of operations. The sequencer 1018 can efficiently distributing processing tasks between the execution clusters 810 and 812. As discussed above, the execution clusters 810 and 812 may apply a series of convolution kernels to different portions of input data to generate the stream of even data values 842 including even index output channels and the stream of odd data values 844 including odd index output channels. For example, the kernel memory 808 provides filter elements of a sequence of convolution kernels for each set of pixel data stored in multiplier circuits FE0 through FEN. Each convolution kernel generates a different output channel of the even data values 842 and odd data values 844.

In another example operation of the sequencer 1018, the size of the input data and/or the number or the size of convolution kernels may be too large for to perform all the computation in a single processing cycle of an execution cluster. The sequencer 1018 divides the computation operation between the even and odd output channels, distributing processing tasks for the even channels to the execution cluster 810 and processing tasks for odd channels to the execution cluster 812.

In some embodiments, the size of the input data and/or the number or the size of convolution kernels may be too large for to perform all the computation in a single processing cycle of the convolution core 802 using both execution cores. In such cases, the sequencer 1018 divides up the computation operations into multiple batches and performs computation based on a subset of input data or a subset of convolution kernels in a single cycle. The computed results in each cycle are processed by the multi-cycle accumulator 1014 to generate the output values 1013 across the multiple cycles. To configure the other components to perform multi-cycle operation, the sequencer 1018 sends multi-cycle control signals 1019 to other components.

The convolution back end 814 includes an output buffer 1024, a large data handler 1028, and output buffer 1030, and a large data handler 1032. The output buffer 1024 is a circuit that stores output values 1013 in its designated locations. In one embodiment, a series of output values for multiple output channels are interleaved in the output buffer 1024. In operations where the output values 1015 of the execution cluster 810 are again fed back as the input data 836 at the convolution front end 806, the data in the output buffer 1024 may be copied to the input buffer 1002 for the next cycle of convolution operation. The output buffer 1024 handles output values 1013 of the execution cluster 810 and the output buffer 1030 handles output values of the 1013 of the execution cluster 812.

The large data handler 1032 is a circuit that performs further processing of output values stored in the output buffer 1024. For example, the convolution core 802 may process input data and convolution kernels having different bit sizes, such as either 8-bit or 16-bit precision. When either the input data or the convolution kernel has 16-bit precision, twice the number of clock cycles is used for each output pixel. When both the input data and the convolution kernel has 16-bit precision, four times more clock cycles are used. The convolution back end 814 can merge the results of 8 bit pixel data convolution from multiple clock cycles into data having 16 bit precision. The large data handler 1032 can perform similar processing for output values stored in the output buffer 1024 from the execution cluster 812. The stream of even data values 842 is output from the large data handler 1028 and the stream of odd data values 844 is output from the large data handler 1032. In some embodiments, the large data handlers 1028 and 1032 are omitted from the convolution back end 814. The streams of even and odd data values 842 and 844 are output from the output buffers 1024 and 1030, respectively. Smaller data sizes may support faster processing for machine inferencing tasks, or other tasks where lower precision data can be used. In contrast, larger data sizes can be used for machine training or higher precision tasks.

The components in the convolution core 802 (as well as other components of the convolution engine 414) may be configured during a configuration period by receiving configuration information from the central control 320. The configurable parameters and modes as instructed in the configuration information may include, but are not limited to, sparsity values, step values, mapping between pixel data values and filter elements, type of operations to be performed at compressor 1010 (e.g., accumulate, min, max or median), the number of channels of input data or output values, and the selection of post-processing operations to be performed at the post-processing circuit 804.

The structure of the convolution core 802 in FIG. 10 is merely illustrative. For example, the multi-cycle accumulator 1014 may be omitted so that only a single cycle operation is performed at the convolution engine.

Figure 11A:
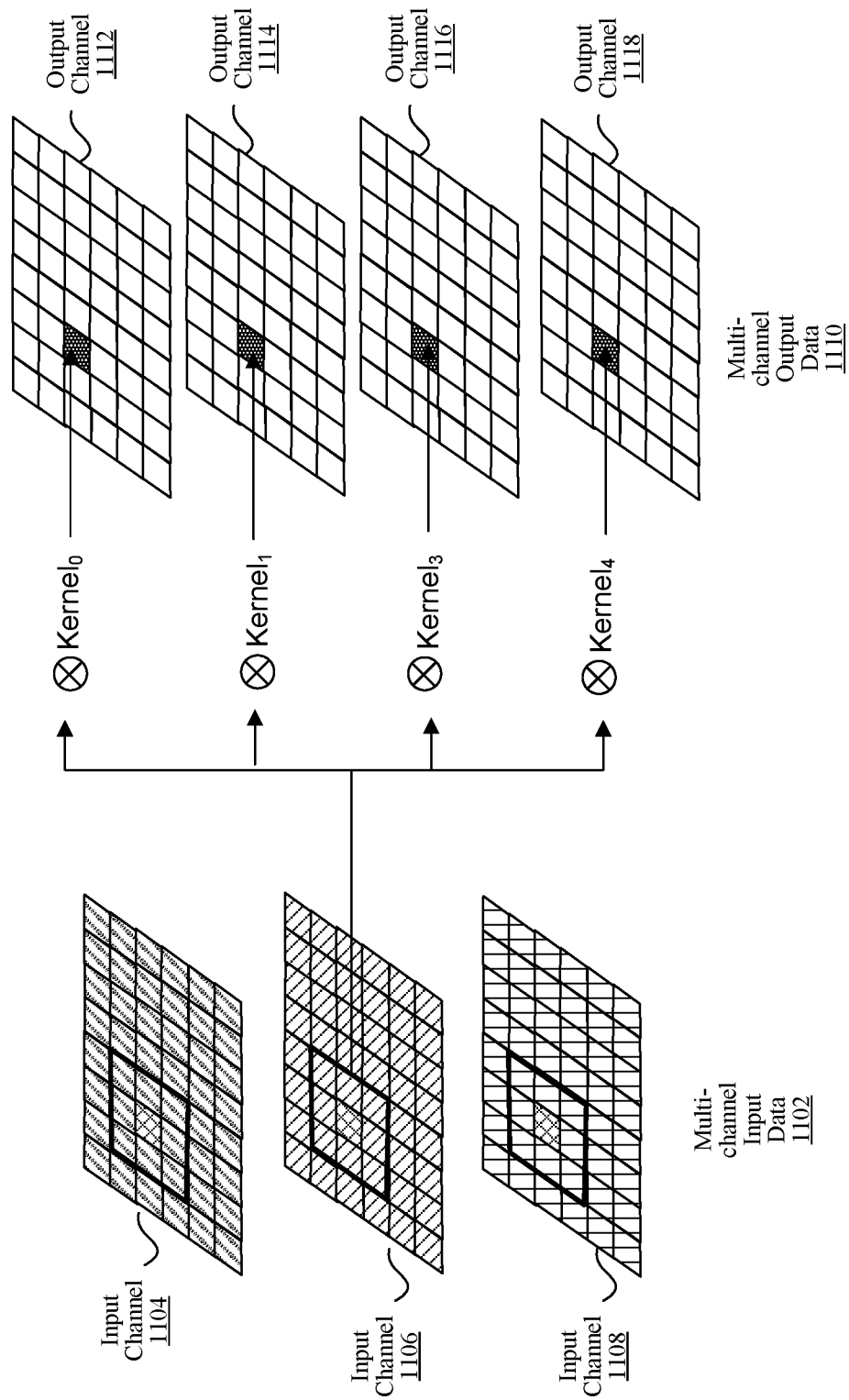
FIG. 11A is a conceptual diagram illustrating inputs and outputs of the convolution core circuit in a multi-planar format, according to one embodiment.

FIG. 11A is a conceptual diagram illustrating inputs and outputs of the convolution core circuit 800 in a multi-planar format, according to one embodiment. The convolution core circuit 800 performs convolution on multi-channel input data 1102 and generates multi-channel output data 1110. The number of input and output channels may be different. The multi-planar format shown in FIG. 11A represents each input and output channel as a separate image plane. The multi-channel input data 1102 has pixel values for three input channels 1104, 1106, and 1108. Each input channel 1104, 1106, and 1108 can be processed with one or more kernels. For example, applying four convolution kernels, $kernel_0$ through convolution $kernel_3$ as shown in FIG. 11A, to the channel 1106 results in multi-channel output data 1110 including four output channels 1112, 1114, 1116, and 1118. If the same four convolution kernels 0 through 3 are applied to each of the input channels 1104, 1106, and 1108 on a per-channel basis (e.g., using a sparse kernel), the multi-channel output would include four channels for each processed input channel for twelve total output channels. A different convolution kernel may be used to generate each distinct output channel. The size, sparsity values, and step values of a convolution kernel may be flexible to allow for different types of convolutions for different applications.

Figure 11B:
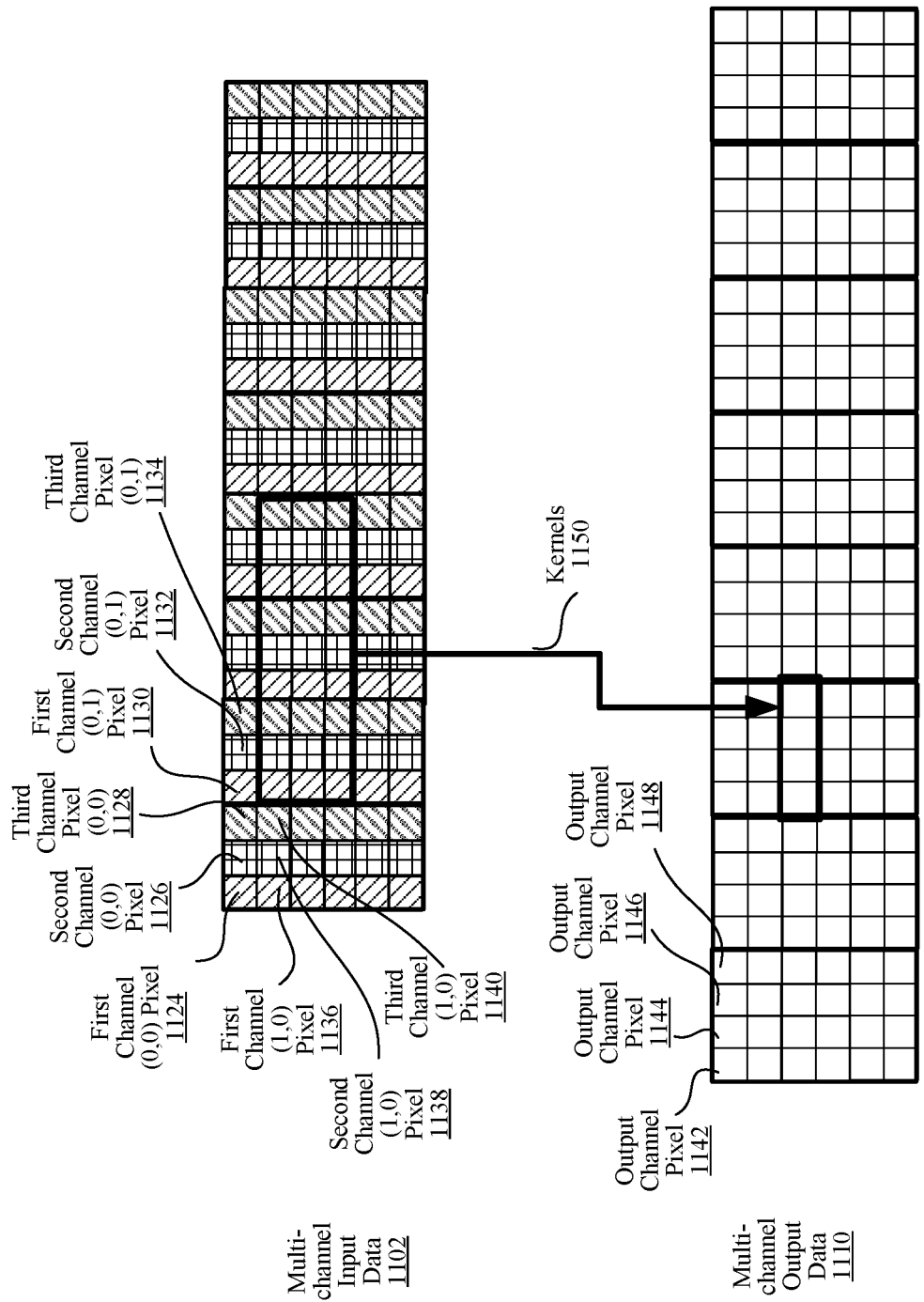
FIG. 11B is a conceptual diagram illustrating inputs and outputs of a convolution core circuit in a planarized format, according to one embodiment.

FIG. 11B is a conceptual diagram illustrating inputs and outputs of a convolution core circuit 800 in a planarized format, according to one embodiment. The multi-channel input data 1102 and the multi-channel output data 1110 are each defined by streams of multiple channels n interleaved manner where corresponding pixel values of each channel (identified by boxes of differently hatched patterns in FIG. 11B) are adjacent to each in the stream, followed by corresponding pixel values of each channel of a next pixel, and so forth in a raster fashion as shown by the planarized format. The planarized format includes images from multiple interleaved channels represented as a single image plane of interleaved channels.

The multi-channel input data 1102 is defined by a stream where correlated pixels values from different channels are adjacent to each other in the planarized format. For example, the first channel pixel 1124, second channel pixel 1126, and third channel pixel 1128 represents the first (0, 0) pixel of an input image defined by the multi-channel input data 1102. Pixel values for the next pixel (0, 1) of the multi-channel input data 1102 follows the pixels 1124, 1126, and 1128. The next pixel (0, 1) includes the first channel pixel 1130, the second channel pixel 132, and the third channel pixel 1134. The subsequent pixels in the first row (0) may follow the (0, 1) pixel accordingly. The pixel values for the subsequent row (1) may follow the pixel values for the first row. For example, the first pixel in the second row (1, 0) includes the first channel pixel 1136, followed by the second channel pixel 1138, followed by the third channel pixel 1140.

In one example, the input channels of the multi-channel input data 1102 include RGB color channels. In another example, the multi-channel input data 1102 may include YCbCr color channels. In another example, the multi-channel input data 1102 may include output channels of convolution results derived with convolution kernels.

The multi-channel output data 1110 is derived from the multi-channel input data 1102 by applying convolution kernels, such as the convolution kernel 1150. The multi-channel output data 1100 includes a stream of correlated pixels values from different output channels that are adjacent to each other in the stream, as illustrated by the planarized format. For example, the output channel pixels 1142, 1144, 1146, and 1148 correspond with a (0, 0) pixel of the output data 1110. The output channel pixels 1142, 1144, 1146, and 1148 respectively belong to the output channels 1112, 1114, 1116 and 1118 as shown in FIG. 11A. As such, a serial stream can define the interleaved channels of the output data 1110 in a raster fashion.

When the convolution engine 414 operates in the cascade mode, the convolution core circuit 800 uses an output of another convolution core circuit 800 as input as discussed above in connection with FIG. 6B. The multi-channel input data 1102 and multi-channel output data 1110 of the convolution core circuit 800 have a common interleaved format to facilitate multiple modes of operation, including modes that use the output data of a convolution core circuit 800 as input data of another convolution core circuit 800.

Per-Channel Spatial Pooling and Normalization

Figure 12:
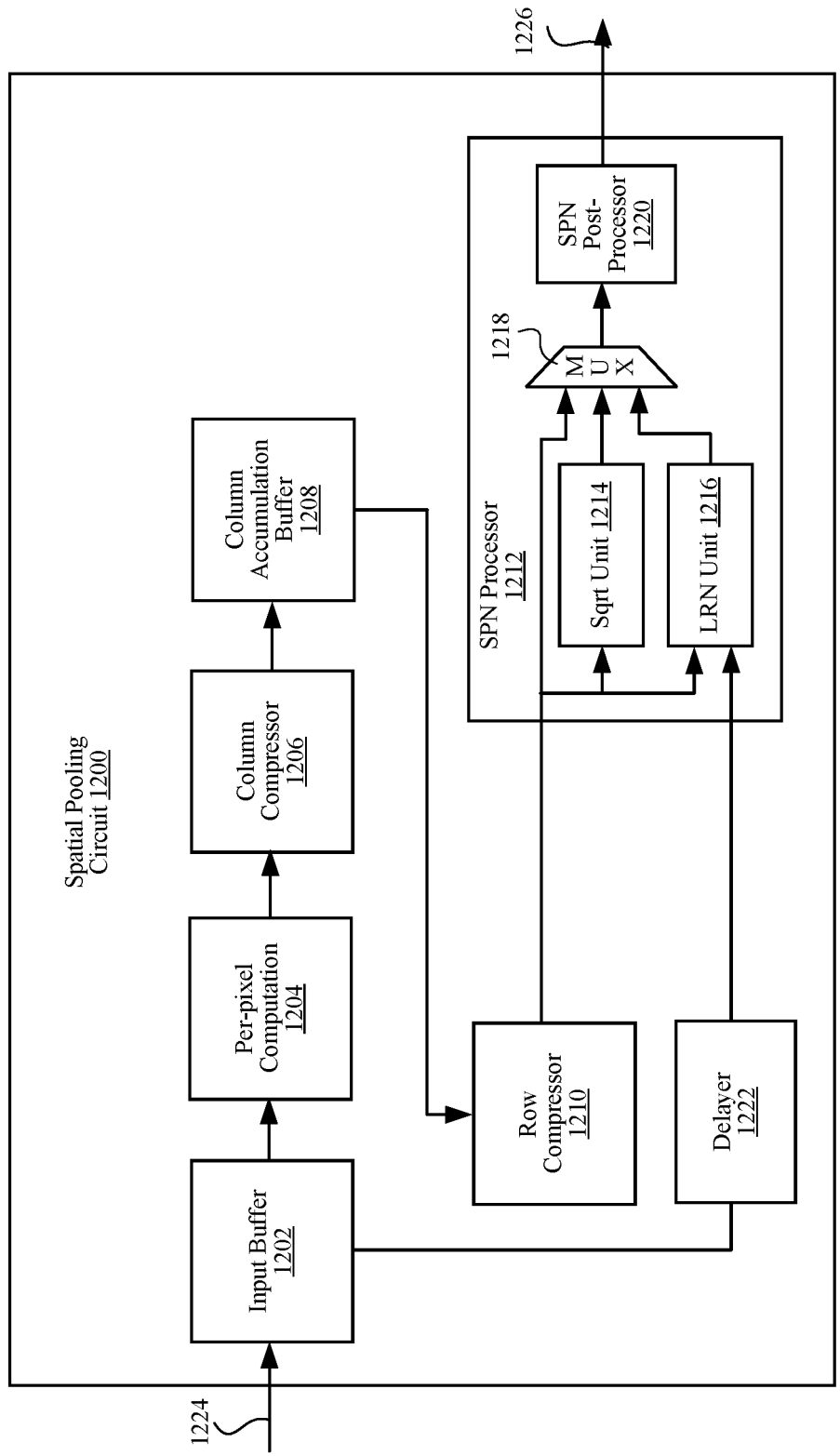
FIG. 12 is a block diagram illustrating a spatial pooling circuit, in accordance with one embodiment.

FIG. 12 is a block diagram illustrating a spatial pooling circuit 1200, in accordance with one embodiment. The spatial pooling circuit 1200 performs per-channel spatial pooling or normalization operations on a stream having multiple interleaved channels, and generates an output stream also the multiple interleaved channels. As discussed above in connection with FIG. 5, the convolution circuits 502 and 504 respectively include the spatial pooling circuit 514 and the spatial pooling circuit 524 to process the output stream of a respective convolution core circuit 512 and 522. The spatial pooling circuit 1200 is an embodiment of the spatial pooling circuit 512 of the first convolution circuit 502, or the spatial pooling circuit 524 of the second convolution circuit 504. In accordance with instructions from the central control 320, the spatial pooling circuit 1200 perform per-channel spatial pooling and/or per-channel local response normalization on some or all of the input interleaved channels.

The spatial pooling circuit 1200 includes an input buffer 1202, a per-pixel computation block 1204, a column compressor 1206, a column accumulation buffer 1208, a row compressor 1210, a delayer 1222, and a spatial pooling and normalization (SPN) processor 1212. The SPN processor 1212 includes a square root unit 1214, a local response normalization unit (LRN) 1216, a multiplexer 1218, and a SPN post-processor 1220.

The input buffer 1202 receives the stream of values 1232 from the convolution core circuit 512 and stores the input data. The input data includes a stream of data values defining multiple channels in an interleaved manner, and these data values are stored in the input buffer 1202 as they are received in the stream. The input buffer 1202 stores multiple pixel values of the same channel to facilitate the per-channel processing. To generate a spatially pooled pixel, the input buffer 1202 is sized to store at least enough input pixel values to fit a local window. In the planarized format where pixel values from multiple interleaved channels are represented as a single image plane, the local window has a sparsity to select pixel values only for a single channel. The size (e.g., height or width) of the local window, defining the number of pixel values of the same channel to be spatially pooled, may be configurable, such as by instructions from the central control 320. The horizontal stride of the local window, defining the pixel space between center pixels of the local window, may also be configurable, such as by instructions from the central control 320. Because the input buffer 1202 receives a stream of interleaved channels where pixel values for a channel are separated by pixel values for one or more other channels, the input buffer 1202 stores multiple pixel values for each of multiple channels.

The local window may include multiple pixel values of a single channel to be spatially pooled into a spatially pooled pixel value. For each spatially pooled pixel, the spatial pooling circuit 1200 performs a column pooling to combine pixel values from a column of the local window, and then a row pooling to combine the column pooled values of the local window. It is noted that "row" and "column" refer to perpendicular pixel lines of a planarized image, and not necessarily particular horizontal or vertical orientations.

For each spatially pooled pixel, the per-pixel computation 1204 retrieves data values of a channel of the local window from the input buffer 1202, and performs operations on the data values. The operations may include applying an offset to a data value, squaring a data value, or determining an absolute value of the data value.

The column compressor 1206 combines multiple data values from the per-pixel computation 1204 associated with a column of the local window into a single spatially pooled value representative of the column. The column compressor 1206 can combine the multiple data values in various ways, as may be specified by the central control 320. For example, the column compressor 1206 may select the minimum value, the maximum value, or may combine the values into a sum.

The column accumulation buffer 1208 receives multiple spatially pooled column values from the column compressor 1204, and stores the spatially pooled column pixel values. For example, the column accumulation buffer 1208 stores at least the spatially pooled column values of each column of the local window.

The row compressor 1210 combines the spatially pooled column values of each column of the local window Like the column compressor 1206, the row compressor 1210 can combine the multiple data values in various ways, as may be specified by the central control 320. For example, the row compressor 1210 may select the minimum value, the maximum value, or may combine the values into a sum. The output of the row compressor 1210 represents a spatially pooled value derived from each pixel of the local window.

The SPN processor 1202 processes spatially pooled values received from the row compressor 1210. For example, the SPN processor 1202 may determine the square roots of the spatially pooled values. The SPN processor 1202 may alternatively or additionally perform a local response normalization to the input stream 1222 using the spatially pooled values.

The SPN processor 1202 includes a square root unit 1214, a LRN unit 1216, a multiplexer 1218, and a SPN post-processor 1220. The square root unit 1214 calculates square roots of the spatially pooled values from the row compressor 1210.

The LRN unit 1216 performs the local response normalization by applying the spatially pooled values from the row compressor to input values stored in the delayer 1222 to generate per-channel normalized values. The delayer 1222 facilitates the local response normalization by synchronizing the spatially pooled values with corresponding input values from the input buffer 1202. The delayer 1222 is coupled to the input buffer 1202 and the LRN unit 1216. The delayer 1222 may include a first-in-first-out (FIFO) memory buffer.

The multiplexer 1218 selects an output from the spatially pooled values of the row compressor 1210, the square root of the spatially pooled values from the square root unit 1214, or the normalized values from the LRN unit 1216. The SPN post-processor 1220 receives the selected output of the multiplexer 1218, and performs a scale, offset, and/or shift operation. The output of the SPN post-processor 1220 is a stream of pixel values defining multiple channels in an interleaved manner, where the pixel values are processed with per-channel spatial pooling and/or per-channel normalization.

In some embodiments, the central control 320 operates the spatial pooling circuit 1200 in different modes by configuring combinations of operation for the components.

As discussed above in connection with FIG. 5, the output stream 530 of the spatial pooling circuit 514 of the first convolution circuit 502 may be used as input to a second convolution circuit 504, or may be provided to the channel merge circuit 506 for interleaving with the output of the second convolution circuit 504.

Figures 13A, 13B:
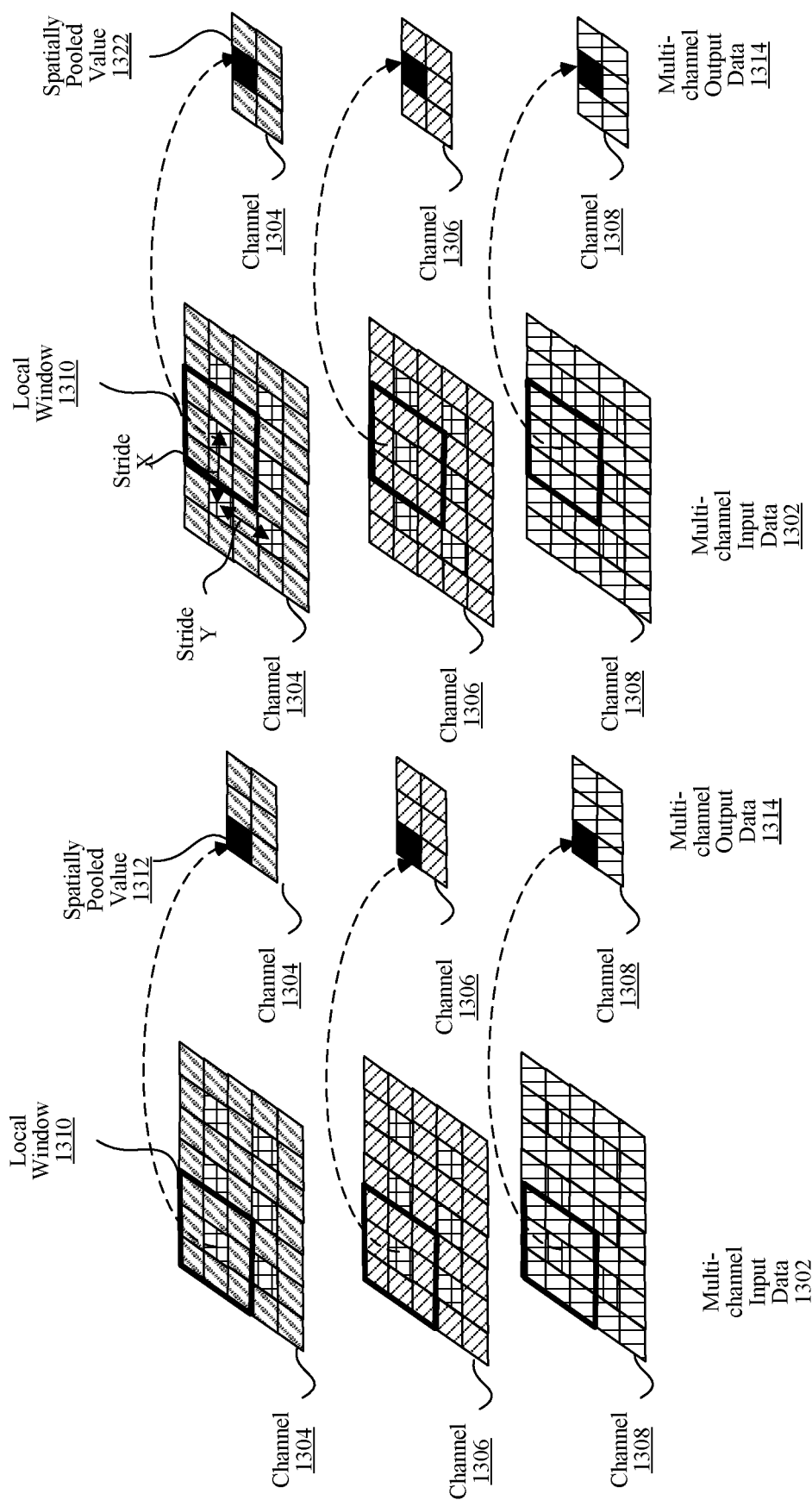
FIGS. 13A and 13B are conceptual diagrams illustrating inputs and outputs of the spatial pooling circuit in a multi-planar format, according to one embodiment.

FIGS. 13A and 13B are conceptual diagrams illustrating inputs and outputs of the spatial pooling circuit 1200 in a multi-planar format, according to one embodiment. The spatial pooling circuit 1300 performs per-channel spatial pooling and/or per-channel LRN on a multi-channel input image and generates a multi-channel output. The number of input and output channels are preserved, with the pixel image size of each image being decreased via the spatial pooling.

The multi-planar format of FIGS. 13A and 13B represents each input and output channel as a separate image plane. The multi-channel input data 1302 has pixel values from multiple channels such as channels 1304, 1306, and 1308. The pixel values of a local window 1310, having a width and height of three pixels in this example, are spatially pooled to generate the spatially pooled value 1312 for the output channel 1304. The spatial pooling circuit 1200 generates the multi-channel output data 1314 for the channels 1304, 1306, and 1308 using the local window 1310 for each channel on an individual basis.

After the first spatially pooled values (e.g., value 1312) of multiple channels are calculated as shown in FIG. 13A, the local window 1310 is shifted as shown in FIG. 13B to calculate the next spatially pooled values (e.g., value 1322) of the channels. In this example, the local window 1310 is shifted two pixels in the column dimension according to a raster fashion. This results in the center pixel of the local window 1310 being shifted two pixels in the column dimension. The amount center pixel shift of the local window 1310 per spatially pooled pixel calculation may be configurable. The local window can shift in the raster fashion according to predefined row ("StrideX") and column ("StrideY") parameters for each spatially pooled pixel until all spatially pooled pixels are calculated. Using StrideX and StrideY parameters larger than 1 results in subsampling to reduce data size and computational cost. When these factors are equal to 1, no output pixel is skipped. The pixel values of the shifted local window 1310 are spatially pooled to generate the spatially pooled value 1322 of the output channel 1316.

Figure 13D:
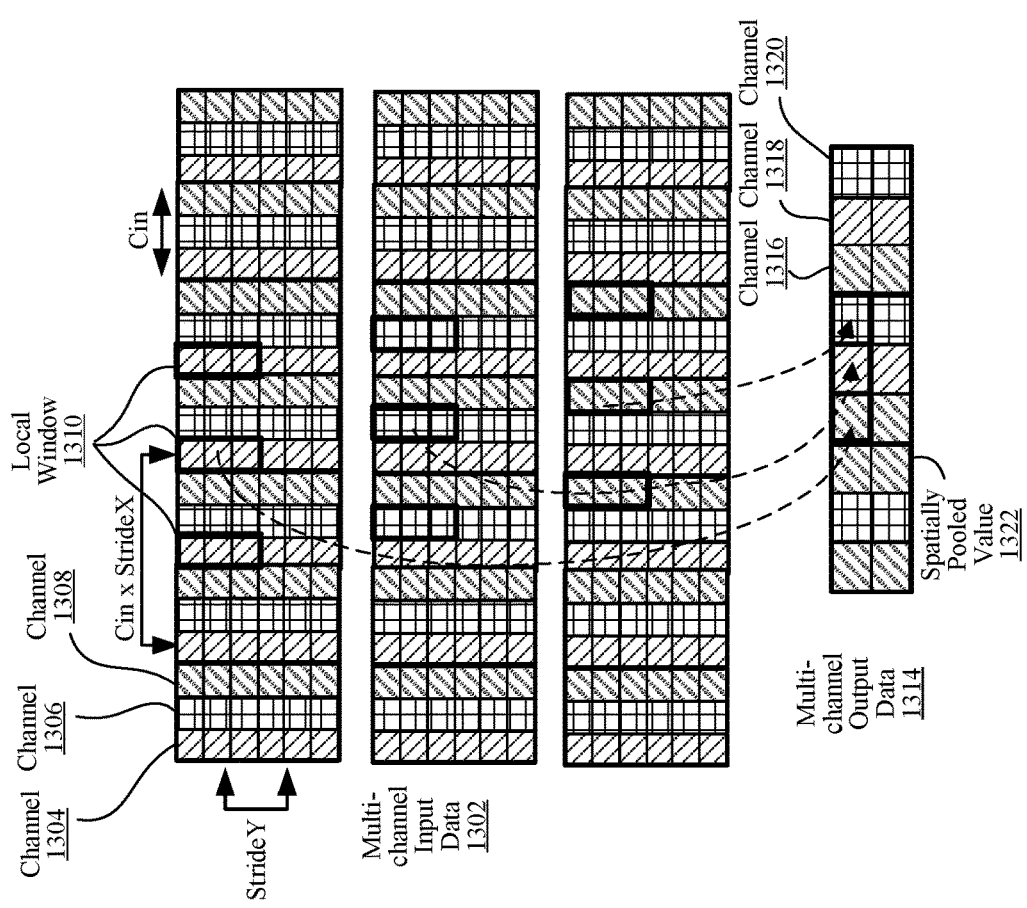
FIGS. 13C and 13D are conceptual diagrams illustrating the inputs and outputs of the spatial pooling circuit in a planarized format, according to one embodiment.
Figure 13C:
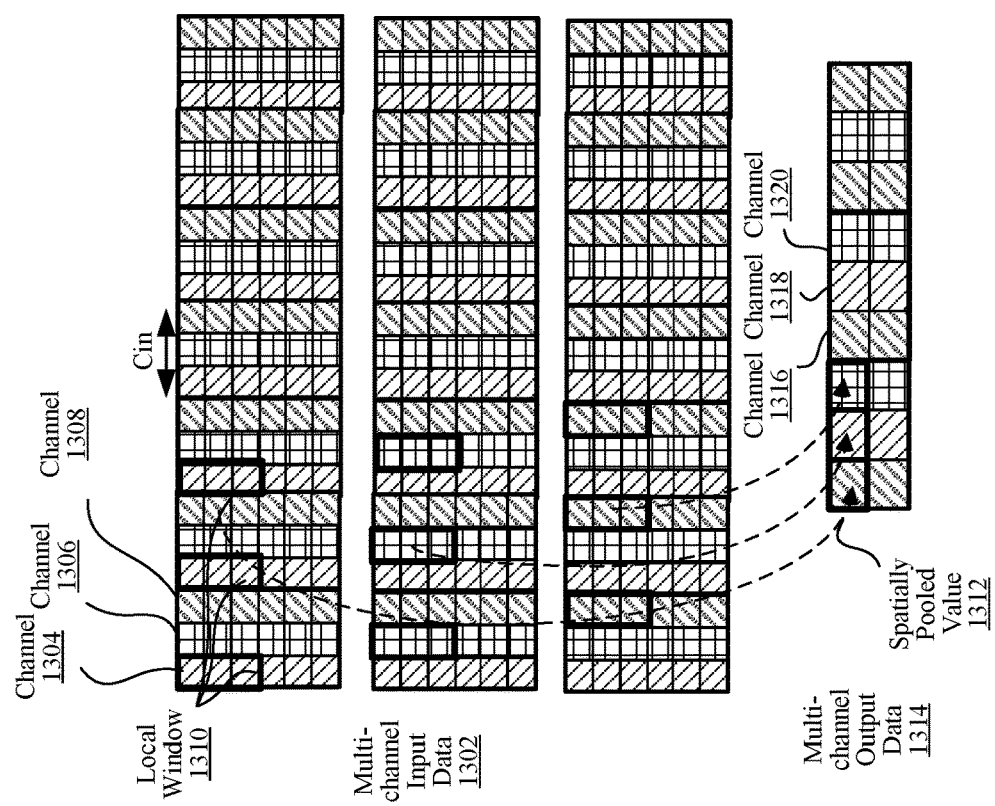

FIGS. 13C and 13D are conceptual diagrams illustrating the inputs and outputs of the spatial pooling circuit 1300 in a planarized format, according to one embodiment. FIG. 13C corresponds with the multi-planar format shown in FIG. 13A, and FIG. 13D corresponds with the multi-planar format shown in FIG. 13B. In the planarized format, each input channel is represented as pixel columns that are placed at horizontal interval of Cin, where Cin denotes the number of input channels. Thus, when per-channel operation is applied to local windows, the kernel support becomes sparse in the planarized format as shown by local window 1310.

The row ("StrideX") and column ("StrideY") shift values are defined in units of pixels in the spatial coordinate of a channel in the multi-planar format. In the planar format, the actual amount of row shift is determined by multiplying the row shift value StrideX by the number of input channels Cin.

Figure 14:
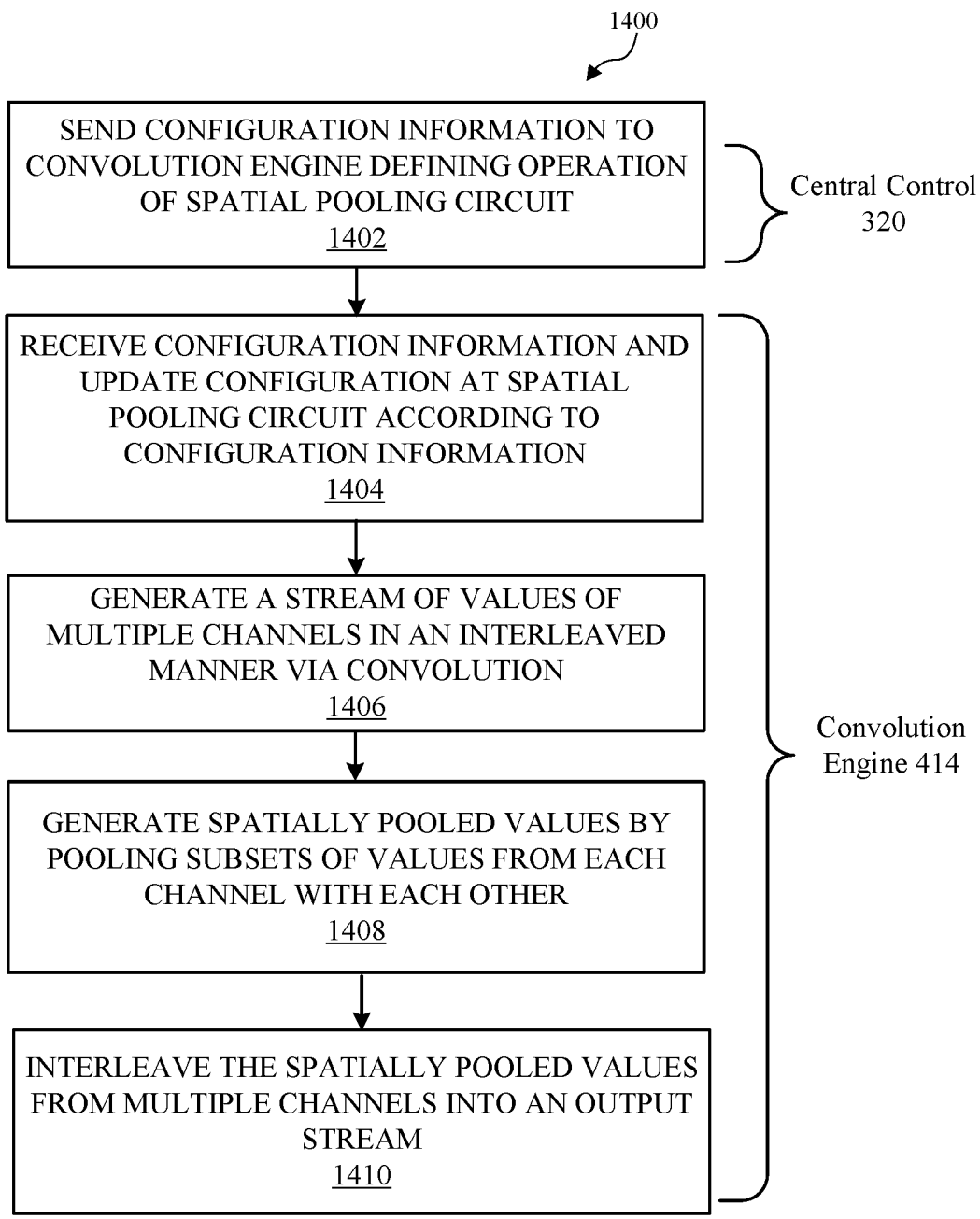
FIG. 14 is a flow chart illustrating a method of operating a spatial pooling circuit, in accordance with one embodiment.

FIG. 14 is a flow chart illustrating a method 1400 of operating a spatial pooling circuit 1200, in accordance with one embodiment. The central control 320 sends 1402 configuration information to the spatial pooling circuit 1200. The configuration instructions may be sent in connection with the other configuration instructions for the convolution engine 414, as discussed at 702 of method 700.

The configuration instructions may include instructions that define a mode of operation of the spatial pooling circuit 1200. The different modes of operation may define different types of spatial pooling or per-channel LRN. In a max pooling mode, the column compressor 1206 and row compressor 1210 select maximum values, and the multiplexer 1218 selects the output of the row compressor 1210. Here, the post-accumulation processing of the SPN processor 1212 is bypassed such that the output of the spatial pooling circuit 1200 has no local response normalization or square root application. In an average pooling mode, the column compressor 1206 and row compressor 1210 generate sums, and multiplexer 1218 selects the output of the row compressor 1210 to bypass post-accumulation processing.

In a L1-pooling mode, the per-pixel computation 1204 determines absolute values, the column compressor 1206 and row compressor 1210 calculates sums of the absolute values, and the multiplexer 1218 selects the output of the row compressor 1210 to bypass post-accumulation processing. In a L2-pooling mode, the per-pixel computation 1204 determines squared values, the column compressor 1206 and row compressor 1210 calculates sums of the squared values, the square root unit 1214 determines the square root of the sums of the squared values, and the multiplexer 1218 selects the output of the square root unit 1214.

In a per-channel LRN mode, the per-pixel computation 1204 determines squared values, the column compressor 1206 and row compressor 1210 calculates sums of the squared values, the LRN unit 1216 normalized values using the square root of the sums of the squared values, and the multiplexer 1218 selects the output of the LRN unit 1216.

After receiving the configuration information, the configuration of the spatial pooling circuit 1200 is updated 1404 according to the configuration information to perform operations as described in the configuration information. Updating the configuration may include setting the operation of the per-pixel computation 1204, the column compressor 1206 and row compressor 1210, the square root unit 1214, and the multiplexer 1218 in accordance with the mode of operation defined by the configuration information.

A convolution core circuit 512 (or 522) generates 1406 a stream of values of multiple channels in an interleaved manner by performing convolution operations on input data. For example, the convolution core circuit 512 performs convolution operations on input data using multiple convolution kernels to generate the stream of values including multiple channels in accordance with the configuration instructions. The convolution circuit 512 may further perform and one or more post-processing operations on the convolution results as specified by the configuration instructions. In some embodiments, the post-processing operations include inter-channel operations such as multi-channel NCC and inter-channel LRN. These operations combine values from different channels and are different from per-channel operations of the spatial pooling circuit 1200. If the convolution core circuit 512 includes multiple execution clusters, the output streams of multiple execution clusters may be combined to generate the stream of values of multiple channels in an interleaved manner output by the convolution core circuit 512.

The spatial pooling circuit 1200 generates 1408 spatially pooled values by pooling subsets of values from each channel with each other. For example, if the stream from the convolution core circuit 512 includes a first and second interleaved channel, then the spatial pooling circuit 1200 generates first spatially pooled values by pooling subsets of the values of the first channel (e.g., as defined by local windows), and generates second spatially pooled values by pooling subsets of the values of the second channel. The input buffer 1202 ensures a subset of the values of a single channel from the stream 1224 is stored to facilitate the spatial pooling. The subsets of values from each channel may be pooled in various ways based on the selected operations of the per-pixel computation 1204, column compressor 1206, row compressor 1210, and SPN processor 1212. The spatially pooled values may include values derived from different types of spatial pooling such as the max pooling mode, the average pooling mode, L1-pooling mode, or the L2 pooling mode. In another example, the spatially pooled values may include values derived from a normalization, such as the per-channel LRN mode.

The spatial pooling circuit 1200 interleaves 1410 the spatially pooled values from multiple channels into an output stream 1226. The spatial pooling circuit 1200 thus maintains the multi-channel interleaved format received as the input stream 1224 at the output stream 1226, while performing per-channel deep machine learning operations on the input stream 1224.

The spatial pooling circuit 1200 can receive a 2 ppc input stream from the convolution core circuit 512 (or 504), and generates a 2 ppc output stream. If the convolution core circuit 512 provides a 1 ppc stream, the spatial pooling circuit 1200 ignores invalid values and processes only the valid values. If the total width of the output frame is odd, a zero can be added at the end of each line to make the width even.

The process as illustrated in FIG. 14 is merely illustrative and various changes can be made to the process. For example, in a bypass mode, the spatial pooling circuit 1200 may re-packetize the input stream to ensure a 2 ppc output stream containing valid values. The pixel processing components such as the per-pixel computation 1204, and column and row compressors 1206 and 1210 may be bypassed in the bypass mode.

Interleaved Channel Merge

When applications require high throughput or when large deep learning models are used, two convolution circuits 502 and 504 can run in parallel in the dual-convolution mode as discussed above in connection with FIG. 6A. The two convolution circuits 502 and 504 apply different convolution kernels on the same input stream. For example, the first convolution circuit 502 generates the first half of output channels with one or more convolution kernels, while the second convolution circuit 504 generates the second half with one or more different convolution kernels. The channel merge circuit 506 receives the streams from the convolution circuits 502 and 504, and combines the streams into a single output stream including the first half of output channels and the second half of output channels in an interleaved manner. To perform the interleaving, the channel merge circuit has a channel merger 526.

Figure 15:
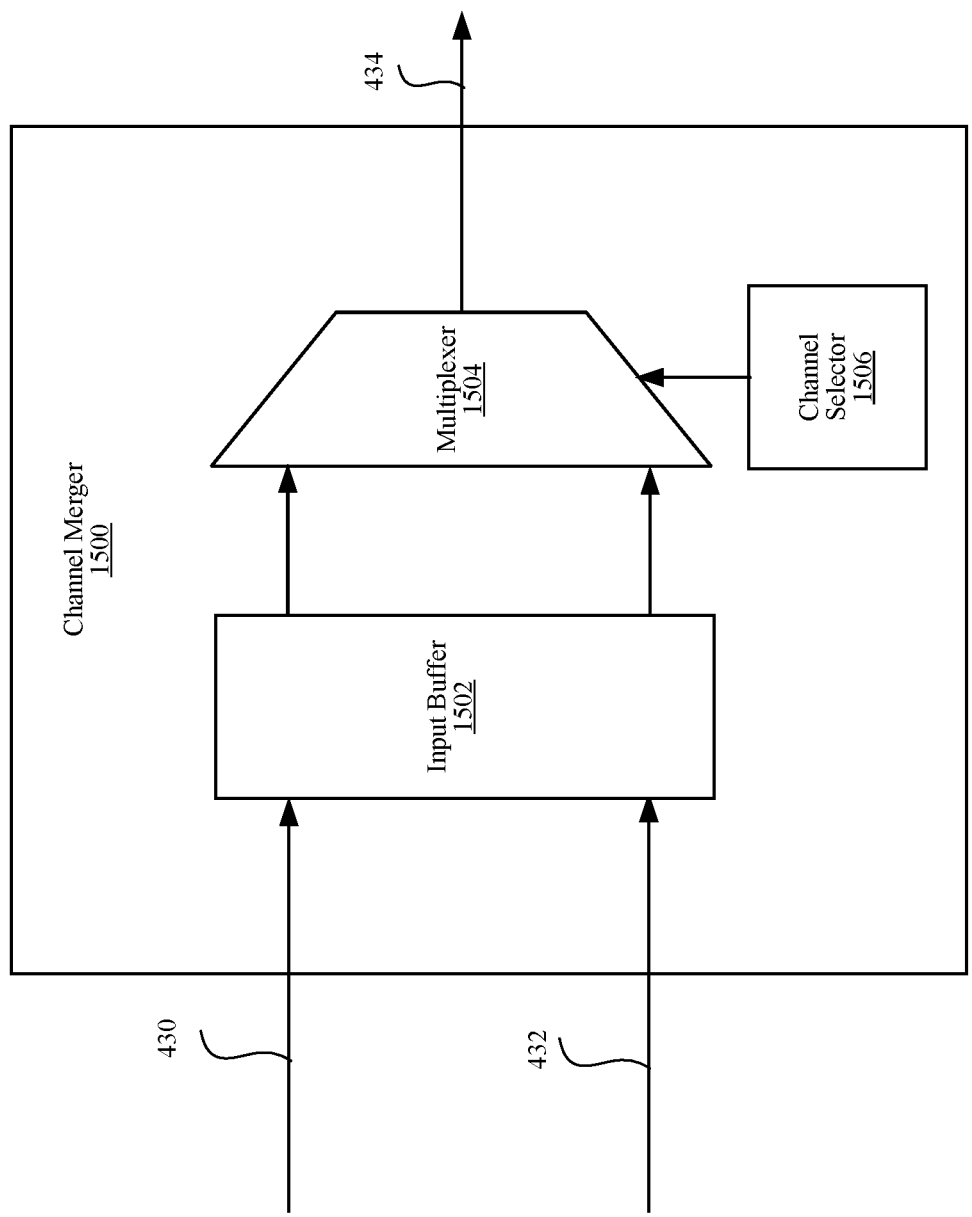
FIG. 15 is block diagram illustrating a channel merger, in accordance with one embodiment.

FIG. 15 is block diagram illustrating a channel merger 1500, in accordance with one embodiment. The channel merger 1500 is an embodiment of the channel merger 526 of the channel merge circuit 506. The output of the channel merger 1500 is selected as the output of the convolution engine 414 when operating in the dual-convolution mode.

The channel merger 1500 includes an input buffer 1502, a multiplexer 1504, and a channel selector 1506. The input buffer 1502 is coupled to the convolution circuit 502 to receive the stream of values 530 and the convolution circuit 504 to receive the stream of values 532. The stream of values 530 and 532 may each include multiple interleaved channels. The input buffer 1502 stores the values 530 and 532 to facilitate synchronization of the values for interleaving.

The multiplexer 1504 is coupled to the input buffer and receives the stream of values 530 and 532 from the input buffer 1502. The channel selector 1506 provides a selection signal to the multiplexer 1504 to control the selection of a value from an input stream for insertion in the output stream of output values 534. The multiplexer interleaves the stream of values 530 and 532, such as by alternatively selecting one or more values from each input stream, to generate the output stream of output values 534. The number of sequential values selected from a particular input stream may be defined by the number of channels per pixel in the stream. The sequence of output values 534 define the channels of the stream of values 530 and 532 in an interleaved manner.

The channel merger 1500 supports two 2 ppc input streams that are synchronized, without slowing down any input stream. The throughput of the merged output is 4 ppc. If the two input streams are not synchronized, one or more of the input sources may be stored using the input buffer 1502 to provide a delay such that the channel merger 1500 receives synchronized input from both input streams.

Figure 16:
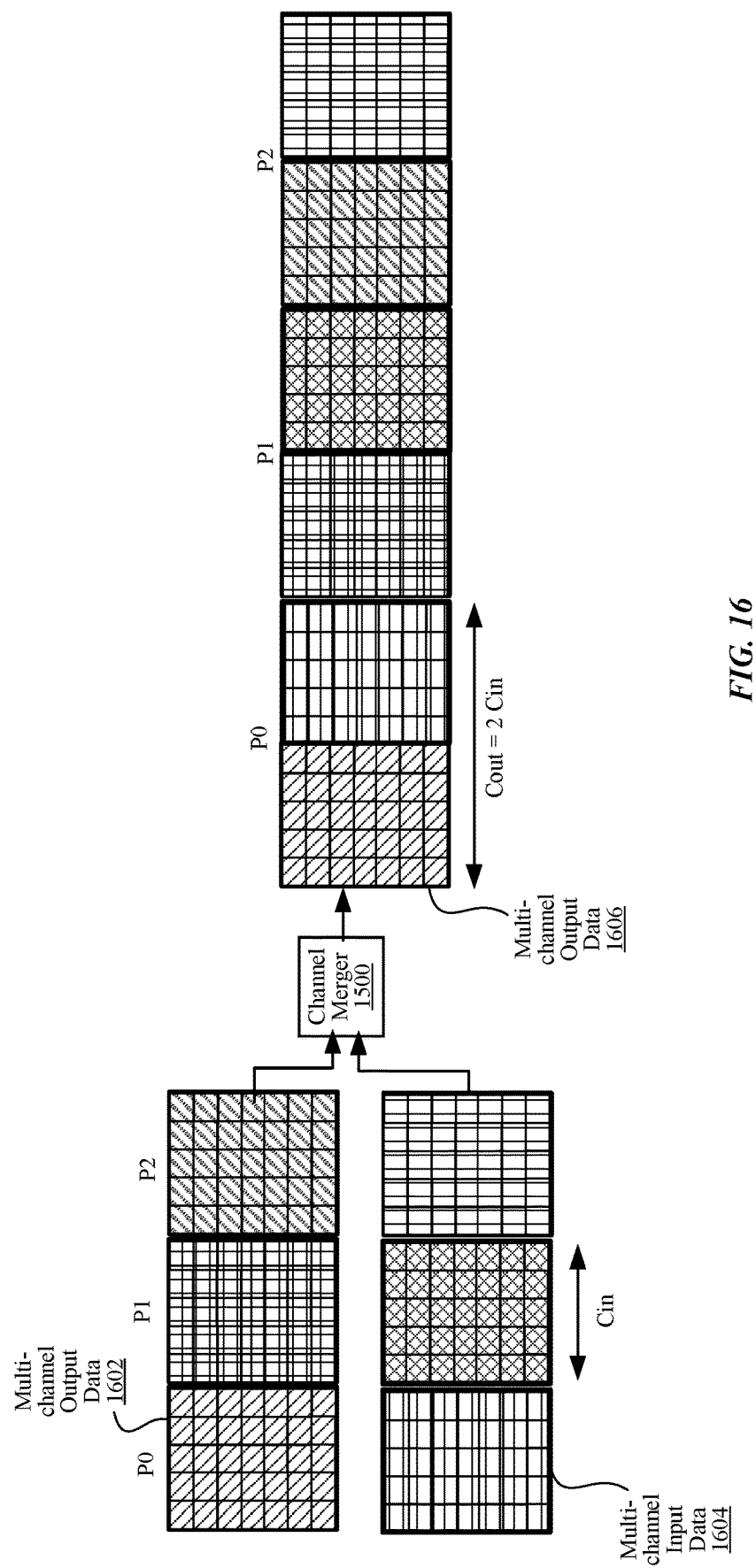
FIG. 16 is a conceptual diagram illustrating inputs and outputs of the channel merger in a planarized format, in accordance with one embodiment.

FIG. 16 is a conceptual diagram illustrating inputs and outputs of the channel merger 1500 in a planarized format, in accordance with one embodiment. In some embodiments, the channel merger 1500 combines two input frames having the same size, as shown by the multi-channel input data 1602 and multi-channel input data 1604. Furthermore, the input streams 530 and 532 have the same number of input channels Cin. In this example, Cin is five, thus each pixel P0, P1, P2, etc. has five channels of values for each stream. The channel merger 1500 generates the multi-channel output data 1606 by interleaving the multi-channel input data 1602 and multi-channel input data 1604 such that the pixel values for each channel of the P0 pixel of the first stream are followed by the pixel values for each channel of the P0 pixel of the second stream. Proceeding in a raster fashion in the planarized format, the pixel values for each channel of the P1 pixel of the first stream follow the pixel values of the P0 pixel of the second stream. For the P1 pixel, the pixel values for each channel of the P1 pixel of the first stream are followed by the pixel values for each channel of the P1 pixel of the second stream.

The channel merger 1500 generates the output stream of output values 534 having double the number of channels as the number of input channels from each of the input streams 530 (including multi-channel input data 1602) and 532 (including multi-channel input data 1604). For example, each pixel P0, P1, etc. of the multi-channel output data has a 10-channel output Cout.

In some embodiments, the channel merger 1500 is disabled in the channel merge circuit 506 when the height and width of the images in the input streams 530 and 532 do not match, or when the number of channels in the input stream 530 and 532 do not match. Rather than operating in the dual-convolution mode, the convolution engine 414 may operate in a different mode that bypasses the channel merger 1500, such as the cascade mode shown in FIG. 6B or the parallel mode shown in FIG. 6C.

In some embodiments, the channel merger 1500 is an embodiment of the core merger 846. The core merger 847 receives two one ppc input streams from each execution cluster 810 and 812 (subsequent to post-processing in separate pipelines), and combines the one ppc input streams into a 2 ppc output stream of the convolution core circuit 800. In contrast, the channel merger 526 receives 2 ppc input streams and generates a 4 ppc output stream. Thus the channel merger 526 has a higher throughput than the core merger 847. The core merger 847 may include a multiplexer that selects data values from the even and odd streams 842 and 844 to generate the output stream, and a channel selector that controls the selection of values by the multiplexer. In some embodiments, the core merger 846 may include one or more input buffers to facilitate the synchronization of the interleaving by storing one or more of the even and odd streams 842 and 844. The size of the memory and processing components of the core merger 846 may be smaller than the size of the memory and processing components of the channel merger 1500 because of the lower throughput.

What is claimed is:

1. A convolution engine, comprising:
   a first convolution circuit, configured to generate a first stream of first values by applying one or more first convolution kernels to first input data, the first values in the first stream defining a first plurality of channels of data in an interleaved manner;
   a second convolution circuit, configured to generate a second stream of second values by applying one or more second convolution kernels to second input data, the second values in the second stream defining a second plurality of channels of data in an interleaved manner, the first and second convolution circuits operating in parallel to generate the first stream of first values and the second stream of second values; and
   a channel merge circuit coupled to the first convolution circuit to receive the first stream and coupled to the second convolution circuit to receive the second stream, the channel merge circuit configured to:
      in a first mode of the convolution engine, generate a first output stream including the first values and a second output stream including the second values, the first input data received by the first convolution circuit being the same as the second input data received by the second convolution circuit; and
      in a second mode of the convolution engine, generate a third output stream including the first values interleaved with the second values, the third output stream defining the first plurality of channels and the second plurality of channels in an interleaved manner, the first input data received by the first convolution circuit being the same as the second input data received by the second convolution circuit.

2. The convolution engine of claim 1, wherein the first convolution circuit applies a first convolution kernel to the first input data concurrently with the second convolution circuit applying a second convolution kernel to the second input data, the first convolution kernel having first filter elements and the second convolution kernel having second filter elements that are different from the first filter elements.

3. The convolution engine of claim 1, wherein the first convolution circuit includes:
   a convolution core including:
      a first execution cluster configured to generate a stream of even data values defining even channels of the first plurality of channels of data; and
      a second execution cluster configured to generate a stream of odd data values defining odd channels of the first plurality of channels of data; and
   a post-processing circuit coupled to the first execution cluster to receive the stream of even data values and coupled to the second execution cluster to receive the stream of odd data values, the post-processing circuit configured to generate the first stream of first values from the stream of even data values and the stream of odd data values.

4. The convolution engine of claim 3, wherein the post-processing circuit includes a multi-channel normalized cross correlation (NCC) unit configured to compute NCC scores for a plurality of first convolution kernels and the stream of even data values.

5. The convolution engine of claim 4, wherein the post-processing circuit further includes a peak finder configured to determine a best match location for a template based on an NCC score associated with an even channel.

6. The convolution engine of claim 3, wherein the post-processing circuit includes a response rectifier unit configured to perform a non-linear transformation to the stream of even data values from the first execution cluster.

7. The convolution engine of claim 3, wherein the post-processing circuit includes an inter-channel local response normalization (LRN) unit configured to perform inter-channel local response normalization to the even data values defining the even channels of the first plurality of channels of data.

8. The convolution engine of claim 3, wherein:
   the post-processing circuit includes:
      a multi-channel normalized cross correlation (NCC) unit coupled to the first execution cluster and configured to compute NCC scores for a plurality of first convolution kernels and the stream of even data values;
      a response rectifier unit coupled to the multi-channel NCC and configured to perform a non-linear transformation to the stream of even data values; and
      an inter-channel local response normalization (LRN) unit coupled to the response rectifier unit and configured to perform inter-channel local response normalization to output of the response rectifier unit; and
   the convolution engine further includes a control circuit configured to selectively activate or deactivate the multi-channel NCC unit, response rectifier unit, and inter-channel LRN unit.

9. The convolution engine of claim 1, further comprising a control circuit configured cause the convolution engine to switch between a plurality of modes including the first and second modes.

10. The convolution engine of claim 9, wherein:
    the second convolution circuit includes a first multiplexer;
    the channel merge circuit includes a second multiplexer; and
    the control circuit is further configured to:
       in the first mode of the convolution engine:
          cause the first multiplexer to select the first input data as the second input data to the second convolution circuit; and
          cause the second multiplexer to select the second stream of second values as the second output stream of the channel merge circuit; and
       in the second mode of the convolution engine:
          cause the first multiplexer to select the first input data as the second input data to the second convolution circuit; and cause the second multiplexer to select the third output stream as output of the channel merge circuit.

11. A method, comprising, by a convolution engine:

generating a first stream of first values by applying one or more first convolution kernels to first input data, the first values in the first stream defining a first plurality of channels of data in an interleaved manner;

generating a second stream of second values by applying one or more second convolution kernels to second input data, the second values in the second stream defining a second plurality of channels of data in an interleaved manner, the first stream of first values and the second stream of second values being generated in parallel;

in a first mode of the convolution engine, generating a first output stream including the first values and a second output stream including the second values, the first input data received by the first convolution circuit being the same as the second input data received by the second convolution circuit; and in a second mode of the convolution engine, generating a third output stream including the first values interleaved with the second values, the third output stream defining the first plurality of channels and the second plurality of channels in an interleaved manner, the first input data received by the first convolution circuit being the same as the second input data received by the second convolution circuit.

12. The method of claim 11, wherein the convolution engine applies a first convolution kernel to the first input data concurrently with applying a second convolution kernel to the input data, the first convolution kernel having first filter elements and the second convolution kernel having second filter elements that are different from the first filter elements.

13. The method of claim 11, further comprising, by the convolution engine:

generating a stream of even data values defining even channels of the first plurality of channels of data;

generating a stream of odd data values defining odd channels of the first plurality of channels of data; and generating the first stream of first values from the stream of even data values and the stream of odd data values.

14. The method of claim 13, further comprising, by the convolution engine:

computing first multi-channel normalized cross correlation (NCC) scores for a plurality of first convolution kernels and the stream of even data values; and computing second multi-channel NCC scores for the plurality of first convolution kernels and the stream of odd data values.

15. The method of claim 14, further comprising, by the convolution engine, determining a best match location for a template based on an NCC score associated with an even channel.

16. The method of claim 13, further comprising, by the convolution engine, performing a non-linear transformation to the stream of even data values.

17. The method of claim 13, further comprising, by the convolution engine, performing inter-channel local response normalization to the even data values defining the even channels of the first plurality of channels of data.

18. An electronic device, comprising:

a circuitry configured to:

generate a first stream of first values by applying one or more first convolution kernels to first input data, the first values in the first stream defining a first plurality of channels of data in an interleaved manner;

generate a second stream of second values by applying one or more second convolution kernels to second input data, the second values in the second stream defining a second plurality of channels of data in an interleaved manner, the first stream of first values and the second stream of second values being generated in parallel;

in a first mode of the circuitry, generate a first output stream including the first values and a second output stream including the second values; and in a second mode of the circuitry, generate a third output stream including the first values interleaved with the second values, the third output stream defining the first plurality of channels and the second plurality of channels in an interleaved manner.

19. The electronic device of claim 18, wherein:

the first input data is the same as the second input data; and the one or more first convolution kernels are different from the one or more second convolution kernels.

20. The electronic device of claim 18, wherein the circuitry includes:

a first execution cluster configured to generate a stream of even data values defining even channels of the first plurality of channels of data;

a second execution cluster configured to generate a stream of odd data values defining odd channels of the first plurality of channels of data; and a post-processing circuit coupled to the first execution cluster to receive the stream of even data values and coupled to the second execution cluster to receive the stream of odd data values, the post-processing circuit configured to generate the first stream of first values from the stream of even data values and the stream of odd data values.

* * * * *